United States Patent
Kishimoto et al.

(10) Patent No.: US 10,385,238 B2
(45) Date of Patent: Aug. 20, 2019

(54) ADHESIVE LAMINATE

(71) Applicant: TEIJIN LIMITED, Osaka (JP)

(72) Inventors: Hiroshi Kishimoto, Chiba (JP); Yume Morita, Ehime (JP); Yukiko Uzawa, Ehime (JP); Daisuke Takahashi, Chiba (JP)

(73) Assignee: TEIJIN LIMITED, Osaka (JP)

( * ) Notice: Subject to any disclaimer, the term of this patent is extended or adjusted under 35 U.S.C. 154(b) by 497 days.

(21) Appl. No.: 14/402,192

(22) PCT Filed: May 29, 2013

(86) PCT No.: PCT/JP2013/065517
§ 371 (c)(1),
(2) Date: Nov. 19, 2014

(87) PCT Pub. No.: WO2013/180305
PCT Pub. Date: Dec. 5, 2013

(65) Prior Publication Data
US 2015/0140324 A1 May 21, 2015

(30) Foreign Application Priority Data

May 30, 2012 (JP) .................................. 2012-123148

(51) Int. Cl.
*C09J 175/02* (2006.01)
*C09J 7/24* (2018.01)
(Continued)

(52) U.S. Cl.
CPC .................. *C09J 7/24* (2018.01); *B32B 7/12* (2013.01); *B32B 27/08* (2013.01); *B32B 27/308* (2013.01);
(Continued)

(58) Field of Classification Search
None
See application file for complete search history.

(56) References Cited

U.S. PATENT DOCUMENTS 3,557,265 A * 1/1971 Chisholm ............... B29C 44/22
264/173.16
8,785,544 B2 7/2014 Miyata
(Continued)

FOREIGN PATENT DOCUMENTS

CN 102449072 5/2012
JP 6-172508 6/1994
(Continued)

OTHER PUBLICATIONS

English machine translation of JP 07205385 (1995).*
(Continued)

*Primary Examiner* — Kenneth J Stachel
(74) *Attorney, Agent, or Firm* — Wenderoth, Lind & Ponack, L.L.P.

(57) ABSTRACT

An adhesive laminate comprising (A) a light-transmitting substrate layer formed from a melt extruded thermoplastic resin, (B) a hard coat layer formed by using a hard coating agent comprising not less than 13 wt % of colloidal silica and/or an alkoxysilane hydrolysis condensate based on the total weight of the layer B excluding a solvent, (C) an adhesive primer layer, and (D) an elastic adhesive layer. Layers (A)-(D) are formed in this order. Layer C is formed from a primer composition comprising a silane coupling agent and has a thickness of 1 to 20 μm and an indentation elasticity modulus of 500 to 4,000 MPa. Layer D has a thickness (Y) of 0.9 to 14 mm.

10 Claims, 4 Drawing Sheets

(51) Int. Cl.
*C09J 175/04* (2006.01)
*B32B 7/12* (2006.01)
*B32B 27/08* (2006.01)
*B32B 27/30* (2006.01)
*B32B 27/36* (2006.01)
*C09J 7/22* (2018.01)
*C09J 7/50* (2018.01)
*C09J 7/25* (2018.01)
*C09J 7/29* (2018.01)

(52) U.S. Cl.
CPC .............. *B32B 27/365* (2013.01); *C09J 7/22* (2018.01); *C09J 7/25* (2018.01); *C09J 7/29* (2018.01); *C09J 7/50* (2018.01); *C09J 175/04* (2013.01); *B32B 2255/10* (2013.01); *B32B 2255/26* (2013.01); *B32B 2307/412* (2013.01); *B32B 2307/51* (2013.01); *B32B 2307/558* (2013.01); *C09J 2201/122* (2013.01); *C09J 2201/162* (2013.01); *C09J 2433/006* (2013.01); *C09J 2469/006* (2013.01); *C09J 2475/00* (2013.01); *C09J 2483/003* (2013.01); *Y10T 428/265* (2015.01); *Y10T 428/31663* (2015.04)

(56) References Cited

U.S. PATENT DOCUMENTS

| | | | |
|---|---|---|---|
| 2003/0021917 A1* | 1/2003 | Hotaka | B32B 27/08 428/29 |
| 2008/0269452 A1* | 10/2008 | Schwoeppe | C08G 18/10 528/28 |
| 2009/0246517 A1* | 10/2009 | Hatta | B32B 17/10018 428/339 |
| 2012/0070676 A1 | 3/2012 | Niimi et al. | |
| 2012/0225241 A1* | 9/2012 | Kashima | B29C 45/0055 428/80 |

FOREIGN PATENT DOCUMENTS

| | | | | |
|---|---|---|---|---|
| JP | 07205385 A | * | 8/1995 | |
| JP | 8-027370 | | 1/1996 | |
| JP | 2000015755 A | * | 1/2000 | |
| JP | 2001-055435 | | 2/2001 | |
| JP | 2001-064470 | | 3/2001 | |
| JP | 2002-117580 | | 4/2002 | |
| JP | 2002-129003 | | 5/2002 | |
| JP | 2004-34631 | | 2/2004 | |
| JP | 2006-255928 | | 9/2006 | |
| JP | 2006255928 A | * | 9/2006 | |
| JP | 2008111072 A | * | 5/2008 | |
| JP | 2010-179867 | | 8/2010 | |
| JP | WO 2011049186 A1 | * | 4/2011 | ......... B29C 45/0055 |
| JP | 2012-57125 | | 3/2012 | |
| JP | 2012-183810 | | 9/2012 | |
| TW | 200403149 | | 6/1992 | |

OTHER PUBLICATIONS

English machine translation of JP 2006255928 (2006).*
Scifinder CAS 1400817-39-1 for GP-402 (2017).*
English machine translation of 2000015755 (2000).*
English machine translation of JP-2008111072 (2008).*
International Search Report dated Aug. 26, 2013 in International (PCT) Application No. PCT/JP2013/065517.
English translation of the International Preliminary Report on Patentability and Written Opinion dated Dec. 11, 2014 in PCT/JP2013/065517.
B. R. Burchard et al., "Adhesives and Sealants: General Knowledge, Application Techniques, New Curing Techniques", Elsevier Science Ltd., 2006, p. 385, Figure 27.
European Search Report dated Oct. 28, 2015 in corresponding European patent application No. 13 79 6495.
Database WPI, Week 200673, Thomson Scientific, London, GB; AN 2006-700777 XP002746843.
Office Action dated Mar. 19, 2019 in corresponding Indian Patent Application No. 8598/CHENP/2014.

* cited by examiner

Stress test

ADHESIVE LAMINATE

TECHNICAL FIELD

The present invention relates to an adhesive laminate which has excellent adhesiveness required for attachment to a structural member.

BACKGROUND ART

Attempts to use a transparent thermoplastic resin as a glass substitute have been made actively in order to reduce weight, improve safety and achieve applications which are impossible with glass. A polycarbonate resin in particular is used for many purposes, making use of its impact resistance, transparency, lightweight and workability.

For instance, Patent Document 1 proposes a structural body which is manufactured by bonding a laminate comprising a colored layer for all or part of the surface of a polycarbonate, a primer layer composed of an acrylic resin layer and a hard coat layer made of an organosiloxane resin, all of which are formed sequentially, to a metal frame by an adhesive in order to use it in windowpanes for automobiles and windowpanes for sunroofs and construction machinery.

However, the laminate of the Patent Document 1 has a problem that stress is produced in a bonding part due to a great influence of the linear expansion of the polycarbonate when the laminate becomes large in size, resulting in a trouble with adhesiveness when it is used outside for a long time.

To solve the above problem, when a large-sized laminate is to be bonded, stress must be relaxed by increasing the thickness of an adhesive as compared with a case where glass of the same size is bonded, whereby the design of the bonding part must be made special.

Meanwhile, even when the laminate is small in size and used in windowpanes for automobiles, the thickness of the adhesive must foe not less than 6 mm to ensure adhesiveness against vibration at the time of driving (refer to Non-patent Document 1).

Therefore, an adhesive laminate which has excellent adhesiveness required for attachment to a structural member without increasing the thickness of an adhesive layer has been desired.

PRIOR ART DOCUMENTS

Patent Document

Patent Document 1 JP-A 2006-255928

Non-Patent Document

Non-patent Document 1 Adhesives and Sealants: General Knowledge, Application Techniques, New Curing Techniques (Elsevier Science Ltd., 2006), p. 385, FIG. 27

DISCLOSURE OF THE INVENTION

It is an object of the present invention to provide an adhesive laminate which has excellent adhesiveness required for attachment to a structural member.

The inventors of the present invention conducted intensive studies and found that, in an adhesive laminate comprising an light-transmitting substrate layer (layer A), a hard coat layer (layer B), an adhesive primer layer (layer C) and an elastic adhesive layer (layer D) all of which are formed in this order, when the layer B has specific composition, the layer C has a specific thickness and a specific indentation elasticity modulus, and the layer D has a specific thickness, if large stress is produced in a bonding part between the substrate layer and the structural member, high adhesiveness is obtained with the same thickness of the adhesive as that when a glass window having small linear expansion is attached thereto. The present invention was accomplished based on this finding.

That is, the present invention is an adhesive laminate comprising (A) a light-transmitting substrate layer (layer A) formed from a melt extruded thermoplastic resin, (B) a hard coat layer (layer B) formed by using a hard coating agent containing not less than 10 wt % of colloidal silica and/or an alkoxysilane hydrolysis condensate based on the total weight excluding a solvent, (C) an adhesive primer layer (layer C) and (D) an elastic adhesive layer (layer D) and is to be attached to a structural member, wherein (i) the layers A to D are formed in this order;
(ii) the layer C is formed from a primer comprising a silane coupling agent, and has a thickness of 1 to 20 μm and an indentation elasticity modulus measured by a nano-indentation method under a load of 800 μN of 500 to 4,000 MPa; and
(iii) the thickness (Y) of the layer D is 0.9 to 14 mm.

The adhesive laminate of the present invention obtains excellent adhesiveness with the same thickness of an adhesive as that when a glass window having small linear expansion is attached at the time of bonding the laminate to a structural member.

BRIEF DESCRIPTION OF THE DRAWINGS

FIG. 5(*b*) is a cross section of lines A-A in FIG. 5(*a*);

FIG. 5(*c*) is a cross section of lines B-B in FIG. 5(*a*); and

EXPLANATION OF LETTERS OR NOTATIONS

Figure 1:
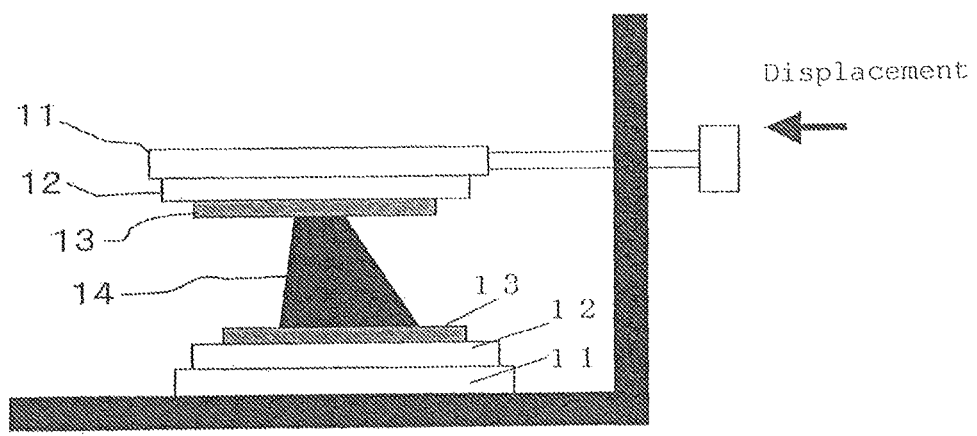
FIG. 1 illustrates a laminate manufactured in Examples 1 to 7 and Comparative Examples 1 to 5 and a stress test.
Figure 2:
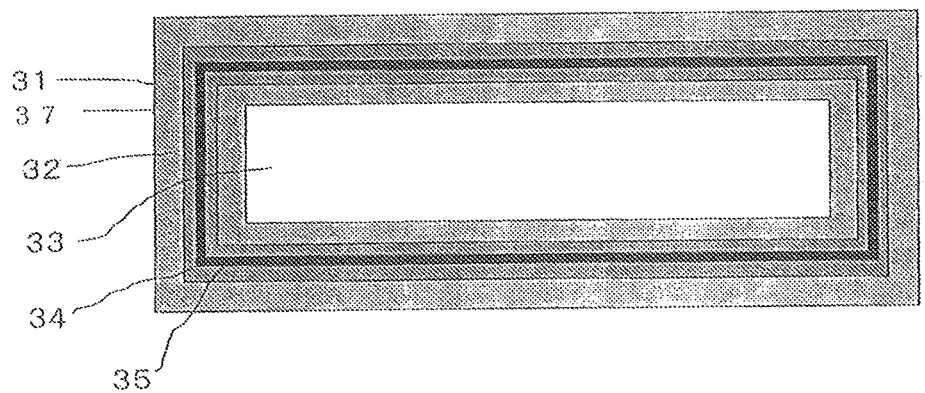
FIG. 2 is a top view of the laminate.
Figure 3:
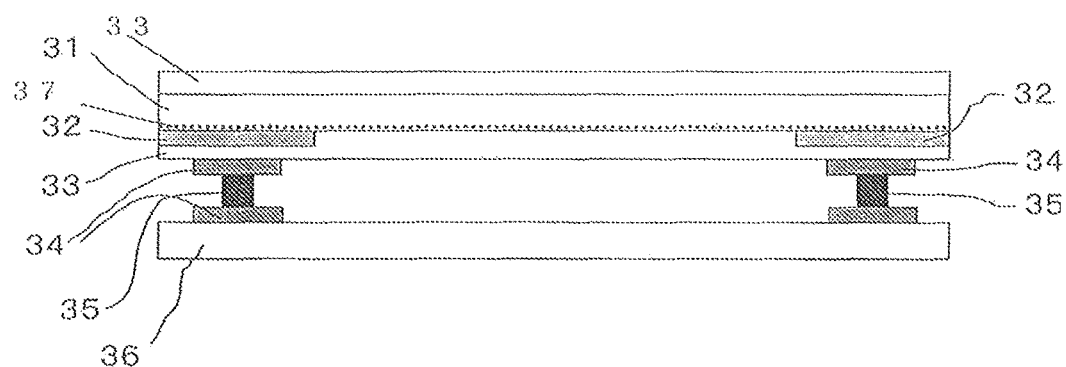
FIG. 3 is a side view of the laminate.

11: substrate layer (layer A)
11(*a*): polycarbonate resin layer
11(*b*): acrylic resin layer
12: hard coat layer (layer B)
12*p*: hard coat (primer) layer
12*t*: hard coat (top) layer
13: adhesive primer layer (layer C)
14: adhesive layer (layer D)
15: black-out layer (layer E)
16: adhesive layer (layer D)
31: polycarbonate layer (layer A)
32: black-out layer (layer E)
33: hard coat layer (layer B)
34: adhesive primer layer (layer C)
35: adhesive layer (layer D)
36: adherend
37: acrylic resin layer (layer A)
1: two-color molded product body (integrated molded product of a sheet product and a frame member)

2: sheet-like product (molding by a fan gate having a thickness of 1.5 mm, thickness of 4 mm)
3: frame member (thickness of 2 mm)
4: pin gates of frame member (four gates, diameter of 1.4 mm)
5: width in vertical direction of frame member (40 mm)
6: width in horizontal direction of frame member (40 mm)
7: width of the above molded product (200 mm)
8: length of the above molded product (300 mm)

BEST MODE FOR CARRYING OUT THE INVENTION

The present invention is described in detail hereinunder.
<Adhesive Primer Layer: Layer C>

The adhesive primer layer (layer C) is formed from a primer comprising a silane coupling agent and has a thickness of 1 to 20 μm and an indentation elasticity modulus measured by a nano-indentation method under a load of 800 μN of 500 to 4,000 MPa.

The thickness of the layer C is 1 to 20 μm, preferably 2 to 10 μm. When the thickness is larger than the lower limit, excellent adhesiveness is obtained and when the thickness is smaller than the upper limit, excellent adhesiveness is obtained with a minimum required amount of the adhesive primer.

The indentation elasticity modulus measured by the nano-indentation method under a load of 800 μN of the layer C is 500 to 4,000 MPa, preferably 1,000 to 3,500 MPa. When the elasticity modulus is higher than the lower limit, satisfactory reactivity with an adherend is obtained and when the elasticity modulus is lower than the upper limit, a satisfactory stress relaxation effect can be expected.

The indentation elasticity modulus is basically measured by applying an adhesive primer to the hard coat layer on the substrate to a thickness of about 50 μm, curing it in an atmosphere having a temperature of 23° C. and a relative humidity of 50%, cutting it cross-sectionally with a microtome to obtain a smooth cross-section and measuring it at around the center of the film thickness. The sample coated with the primer is used to measure its indentation elasticity modulus by a nano-indentation apparatus having a Berkovich indenter ($\alpha$:65.03°). In this measurement, the sample is placed under load at a loading speed of 20.4 mgf/sec, held under a maximum load of 800 μN for 1 second and unloaded at the same loading speed. As an apparatus preferably used for this measurement, the ENT-2100 ultrafine indentation hardness tester of ELIONIX INC. may be used.
(Primer Composition)

The layer C is formed from a primer composition comprising a silane coupling agent. The layer C preferably has excellent adhesiveness to both of the hard coat layer (layer B) and the elastic adhesive layer (layer D).

When an urethane adhesive is used in the elastic adhesive layer (layer D), the primer composition preferably comprises a compound which contains both of an alkoxysilyl group having high reactivity with a siloxane component and an isocyanate group having high reactivity with the urethane adhesive. The alkoxysilyl group of the compound is firmly bonded to the hard coat layer (layer B) directly or through a hydrolytic condensation bond with another alkoxysilyl group-containing compound.

Another silane coupling agent contained in the primer composition is preferably a modified silane which will be described hereinafter, more preferably a modified silane obtained by reacting 0.1 to 1 mole of an aminosilane with 1 mole of an epoxysilane. Further, the epoxysilane is particularly preferably γ-glycidoxypropyltrimethoxysilane, and the aminosilane is particularly preferably N-(β-aminoethyl)-γ-aminopropyltrimethoxysilane or N-(β-aminoethyl)-γ-aminopropylmethyldimethoxysilane.

Meanwhile, the isocyanate group of the compound can be bonded to the urethane adhesive directly or through a compound containing a reactive group to an isocyanate group, such as a compound containing an alcoholic OH group. Therefore, a compound containing both of an alkoxysilyl group and an isocyanate group is preferred as it can bond the hard coat layer and the urethane adhesive through a chemical bond.

Since the adhesive primer (layer C) has a specific elasticity modulus, it relaxes stress applied to the adhesive laminate efficiently. As the primer has the above property, the cross linked structure of the adhesive primer (layer C) is preferably not too dense. From this point of view, the above compound containing both of an alkoxysilyl group and an isocyanate group preferably has a structure that either one of the reactive functional groups is existent apart from the branching base point of a branched structure.

More specifically, a preferred example of the above compound is a reaction product (to be referred to as "silane modified polyisocyanate" hereinafter) between a polyisocyanate compound having a branched structure and a silane coupling agent containing a group having reactivity with an isocyanate group such as γ-mercaptopropyltrimethoxysilane. In this reaction, at least the isocyanate group is caused to remain by adjusting the ratio of the polyisocyanate compound and the silane compound.

Examples of the polyisocyanate compound having a branched structure include polyhydric alcohols such as trimethylol propane, adduct modified materials with a diisocyanate compound, isocyanurate modified materials of TDI and HDI, isocyanurate modified materials of HDI, isocyanurate modified materials of HDI and IPDI, and isocyanurate modified materials of IPDI. The abbreviations of diisocyanate compounds are given below.

That is, the diisocyanate compounds include:
(1) aromatic diisocyanates such as tolylene diisocyanate (generally abbreviated as "TDI", including 2,4-TDI and 2,6-TDI), diphenylmethane diisocyanate (abbreviated as "MDI", including 4,4'-MDI, 2,4'-MDI and 2,2'-MDI), 1,5-naphthylene diisocyanate, 1,4-naphthylene diisocyanate, p-phenylene diisocyanate, m-phenylene diisocyanate, xylylene diisocyanate (abbreviated as "XDI", including o-XDI, m-XDI and p-XDI), tetramethylxylylene diisocyanate (abbreviated as "TMXDI"), 4,4'-diphenyl ether diisocyanate, 2-nitrodiphenyl-4,4'-diisocyanate, 2,2'-diphenylpropane-4,4'-diisocyanate, 3,3'-dimethyldiphenylmethane-4,4'-diisocyanate, 4,4'-diphenylpropane diisocyanate and 3,3'-dimethoxydiphenyl-4,4'-diisocyanate;
(2) aliphatic diisocyanates such as tetramethylene diisocyanate, hexamethylene diisocyanate (abbreviated as "HDI"), 2-methyl-1,5-pentane diisocyanate, 3-methyl-1,5-pentane diisocyanate, lysine diisocyanate and trimethylhexamethylene diisocyanate (abbreviated as "TMDI", including 2,2,4-TMDI and 2,4,4-TMDI); and
(3) alicyclic diisocyanates such as isophorone diisocyanate (abbreviated as "IPDI"), hydrogenated tolylene diisocyanate, hydrogenated diphenylmethane diisocyanate (abbreviated as "$H_{12}$MDI"), hydrogenated xylylene diisocyanate (abbreviated as "$H_6$XDI"), hydrogenated tetramethylxylylene diisocyanate and cyclohexyl diisocyanate.

Since molecular mobility is required from the viewpoint of the relaxation of stress whereas a relatively rigid structure is required from the viewpoint of the maintenance of strength as described above, preferred examples of the above polyisocyanate compound include adduct modified materials of a polyhydric alcohol and an aromatic diisocyanate and/or an alicyclic diisocyanate, and isocyanurate modified materials of HDI and an aromatic diisocyanate and/or an alicyclic diisocyanate. The former adduct materials are particularly preferred. The polyhydric alcohol is preferably trimethylol propane, particularly preferably general-purpose trimethylol propane having an equivalent alcoholic OH group. The diisocyanate compound is preferably an alicyclic diisocyanate as it has high weatherability, particularly preferably $H_6XDI$, IPDI or $H_{12}MDI$.

As the silane-modified polyisocyanate, a compound obtained by producing a polyisocyanate compound having a high molecular weight through a reaction with a diol and reacting the polyisocyanate with a reactive silane coupling agent may also be used. Preferred examples of the diol include glycols such as ethylene glycol, 1,4-butanediol and 1,6-hexanediol, 2,2,4-trimethyl-1,3-pentanediol, 2-ethyl-1,3-hexanediol, 2,2-diethyl-1,3-propanediol and 2-n-butyl-2-ethyl-1,3-propanediol.

The primer composition may contain another silane coupling agent, another curing component, a catalyst, a desiccant, a resin component, carbon black and another compound besides a solvent for coating.

The other silane coupling agent complements the above silane-modified polyisocyanate compound to achieve strong adhesiveness to the hard coat layer. This silane coupling agent preferably has activity to an isocyanate group and accordingly, preferably contains an alcoholic OH group, amino group, imino group, mercapto group or epoxy group as a functional group.

Examples of the above silane coupling agent include epoxysilanes such as γ-glycidoxypropyltrimethoxysilane, γ-glycidoxypropylmethyldimethoxysilane, 3,4-epoxycyclohexylethyltrimethoxysilane and 3,4-epoxycyclohexylethylmethyldimethoxysilane, aminosilanes such as aminomethyltriethoxysilane, N-(β-aminoethyl)aminomethyltrimethoxysilane, aminomethyldiethoxysilane, N-(β-aminoethyl)methyltributoxysilane, γ-aminopropyltrimethoxysilane, γ-aminopropylmethyldiethoxysilane, γ-aminoisobutyltrimethoxysilane, N-bis(β-hydroxyethyl)-γ-aminopropyltriethoxysilane, N-(β-aminoethyl)-γ-aminopropyltrimethoxysilane, N-(β-aminoethyl)-γ-aminopropylmethyldimethoxysilane and N-(β-aminoethyl)-γ-amino-β-methylpropyltrimethoxysilane, and mercaptosilanes such as γ-mercaptopropylmethyldimethoxysilane, γ-mercaptopropyltrimethoxysilane, γ-mercaptopropylmethyldiethoxysilane, γ-mercaptopropyltriethoxysilane, γ-methylmercaptopropylethyldimethoxysilane, γ-mercaptopropyltrimethyldiethoxysilane, γ-mercaptopropyldimethylmethoxysilane, γ-mercaptopropylmethyldiethoxysilane, β-mercaptoethylmethyldimethoxysilane, β-mercaptoethyltrimethoxysilane and β-mercaptoethyltriethoxysilane. Further, preferred examples of the silane coupling agent containing an alcoholic OH group include modified silanes prepared by reacting 0.1 to 1 mole of a silane compound having a functional group active to an epoxy group such as the above aminosilane or mercaptosilane with 1 mole of the above epoxysilane.

Examples of the other curing component include diisocyanate compounds and polyisocyanate compounds. Although the curing component contributes to excellent adhesiveness to a urethane adhesive, it becomes a factor for limiting the open time after coating due to water absorption. Therefore, it is preferably not contained for applications in which the freedom degree of open time is desired to be high. Other examples of the curing component include triisocyanate compounds such as triphenylmethane-4,4,4-triisocyanate and tris(p-isocyanatophenyl)thiophosphate besides the above isocyanate compounds. When the other curing component is to be blended, tris(p-isocyanatophenyl)thiophosphate is particularly preferred.

Examples of the resin component include polyester polyurethane resin, acrylic resin, epoxy resin, phenoxy resin, polycarbonate resin and vinyl chloride resin. For applications in which the freedom degree of open time is desired to be high, acrylic resin and epoxy resin are preferred and a mixture of epoxy resin and acrylic resin is particularly preferred. By using the mixture, an open time of preferably 1 month or more, more preferably 2 months or more can be achieved. Although this open time does not have an upper limit from the viewpoint of a chemical reaction, it is actually preferably 6 months or less, more preferably 4 months or less in consideration of the influence of contamination or decomposition by another factor. If the above applications are not required, polyester polyurethane resin is preferred as it has excellent strength.

The epoxy resin has an epoxy equivalent of preferably 1,000 to 10,000, more preferably 1,000 to 5,000. The molecular weight of the acrylic resin is preferably 1,000 to 100,000, more preferably 5,000 to 80,000 in terms of number average molecular weight measured by GPC in terms of standard polystyrene.

The above resin component, may contain an alcoholic OH group or an alkoxysilyl group by modification or copolymerization. This resin component can be used for applications in which the freedom degree of open time is desired to be high. The resin component is more preferably acrylic resin having any one of these functional groups and examples thereof are described in JP-A 2001-064470 and can be advantageously used in the present invention.

Carbon black contained in the primer composition is preferably acid carbon black from the viewpoint of dispersibility. The acid carbon black preferably has a pH of 2.5 to 4. The acid carbon black having a particle size of 10 to 30 nm may be preferably used and may be a mixture of two or more different kinds which differ in average particle diameter.

Examples of the catalyst include metal salts such as dibutyltin dilaurate, bismuth trioctanoate, zinc 2-ethylhexanoate and cobalt salts, and tertiary amines such as N-methylmorpholine and N,N'-dimethylpiperazine. The catalyst particularly preferably contains a metal salt. Examples of the desiccant include synthetic zeolite, natural zeolite, and molecular sieves. A desiccant having a pore diameter of 3 to 10 angstrom may be preferably used. As for other additives, examples of a stabilizer include diethyl malonate. Examples of the solvent, include methyl ethyl ketone, ethyl acetate, butyl acetate, cellosolve acetate, mineral spirit, toluene, xylene, dimethyl acetamide, acetone, n-hexane, methylene chloride, tetrahydrofuran, ethyl ether and dioxane. These solvents may be used in combination of two or more. Further, the above compound may be mixed with a saturated hydrocarbon compound having 5 to 12 carbon atoms such as pentane, hexane, heptane or octane. Out of the above solvents, methyl ethyl ketone, ethyl acetate and butyl acetate are preferred, and ethyl acetate is particularly preferably used as the main component. The amount of the solvent is preferably 100 to 1,000 parts by weight, more preferably 200 to 700 parts by weight based on 100 parts by weight of the total of the above solids.

As for the ratio of the above components in the primer composition, the content of the silane-modified polyisocyanate is preferably 10 to 45 wt %, more preferably 12 to 30 wt %, the content of the other silane coupling agent is preferably 0 to 60 wt %, more preferably 10 to 35 wt %, the content of the resin component is preferably 5 to 35 wt %, more preferably 20 to 30 wt % (the content of the epoxy resin is preferably 3 to 15 wt % for applications in which the freedom degree of open time is desired), the content of the carbon black is preferably 10 to 40 wt %, more preferably 20 to 35 wt %, and the content of the catalyst is preferably 0.01 to 5 wt %, more preferably 0.05 to 3 wt % based on 100 wt % of the solids content excluding the solvent.

The adhesive primer layer (layer C) is formed by applying the primer composition by means of an applicator and drying it at normal temperature in general. Examples of the coating technique include brush coating, spray coating, wire bar coating, blade coating and roll coating.

Preferred examples of the primer composition include Glass Primer GP-402 (of Sunstar Engineering Inc.) and HAMATITE Glass Primer G (MS-90) (of Yokohama Rubber Co., Ltd.).

<Hard Coat Layer: Layer B>

The hard coat, layer (layer B) is formed by using a hard coating agent. The content of colloidal silica and/or an alkoxysilane hydrolysis condensate in the hard coating agent is not less than 10 wt %, preferably not less than 13 wt %, more preferably 15 wt % based on the total weight excluding the solvent. Above the lower limit, when the adhesive primer layer (layer C) is formed on the hard coat layer (layer B), excellent adhesiveness is obtained. The content of the colloidal silica in the hard coating agent is preferably not more than 60 wt %. When the content of the colloidal silica in the hard coating agent exceeds the upper limit, it is difficult to form the hard coat layer (layer B).

The hard coating agent can be obtained by mixing organic solvent-dispersible colloidal silica with a silicone resin-based hard coating agent or an organic resin-based hard coating agent.

The silicone resin-based hard coating agent is used to form a cured resin layer having a siloxane bond and examples thereof include partially hydrolyzed condensates of a compound containing a compound, equivalent to a trifunctional siloxane unit (such as a trialkoxysilane compound) as the main component, preferably partially hydrolyzed condensates containing a compound equivalent to a tetrafunctional siloxane unit (such as a tetraalkoxysilane compound) and partially hydrolyzed condensates obtained by filling metal oxide fine particles such as colloidal silica in these. The silicone resin-based hard coating agent may further contain a bifunctional siloxane unit and a monofunctional siloxane unit. Although the silicone resin-based hard coating agent contains an alcohol produced during a condensation reaction (in the case of partially hydrolyzed condensates of an alkoxysilane), it may be dissolved or dispersed in any organic solvent, water or a mixture thereof as required. Examples of the organic solvent include lower fatty acid alcohols, polyhydric alcohols, and ethers and esters thereof. A surfactant such as a siloxane-based or alkyl fluoride-based surfactant may be added to the hard coat layer in order to obtain a smooth surface state.

Examples of the organic resin-based hard coating agent include melamine resin, urethane resin, alkyd resin, acrylic resin and polyfunctional acrylic resins. The polyfunctional acrylic resins include resins such as polyol acrylate, polyester acrylate, urethane acrylate, epoxy acrylate and phosphazene acrylate.

Further, the resin forming the hard coat layer (layer B) may contain additives and addition aids such as an optical stabilizer, an ultraviolet absorbent, a catalyst, a thermo- or photo-polymerization inhibitor, a polymerization inhibitor, a defoaming agent, a leveling agent, a thickener, a precipitation inhibitor, a sag inhibitor, a flame retardant and an organic or inorganic pigment or dye.

The coating technique may be suitably selected from among bar coating, dip coating, flow coating, spray coating, spin coating and roller coating techniques according to the shape of a molded body which becomes a substrate to be coated.

The method of curing the hard coat layer (layer B) may be at least one selected from the group consisting of ionizing radiation irradiation, infrared irradiation, microwave irradiation, hot water vapor exposure and heating.

The ionizing radiation means radiation having energy quantum which can cause the curing reaction of a coat layer out of electromagnetic waves and charged particle beams. Ultraviolet radiation (UV) or electron beam (EB) is generally used but electromagnetic waves such as X-rays and γ-rays, and charged particle beams such as α-rays and ion beam may also be used.

Curing by infrared irradiation is preferred because curing can be carried out while a rise in the temperature of a substrate can be suppressed as vibration energy is applied in the form of electromagnetic waves to heat locally in a short period of time. When a laser beam is used, it is possible to reduce the diameter of the beam more than that of an ordinary infrared lamp.

Microwave irradiation is preferred because the substrate can be heated without conducting heat to the substrate by vibration by resonance with microwaves.

Out of these curing methods, curing by ionizing radiation irradiation is particularly preferred from the viewpoints of the time required for curing and equipment cost.

The thickness of the hard coat layer is preferably 1 to 30 μm, more preferably 2 to 20 μm, much more preferably 3 to 10 μm. Above the lower limit, the abrasion resistance of the substrate is obtained and below the upper limit, curing unevenness hardly occurs and adhesiveness to the substrate becomes high advantageously.

<Elastic Adhesive Layer: Layer D>

A urethane adhesive is advantageously used as an elastic adhesive constituting the layer D in the present invention. The urethane adhesive may be either a moisture-curable one-pack type urethane adhesive or a two-pack type urethane adhesive but preferably a moisture-curable one-pack type urethane adhesive because it is excellent in production efficiency.

The moisture-curable one-pack type urethane adhesive generally comprises an isocyanate group-containing compound, especially an isocyanate group-terminated urethane prepolymer (to be referred to as "NCO-terminated prepolymer" hereinafter) as the main component and also a plasticizer, a filler, a catalyst and optionally other compounds. The other compounds are aimed to provide desired characteristic properties to the composition, and examples thereof include adhesives such as polyisocyanate compounds and silane coupling agents including γ-mercaptopropyltrimethoxysilane, (meth)acrylate-based copolymers for providing heat-resistant adhesiveness, and foaming agents and micro-balloons for providing lightweight, damping property and sound insulating property. The content of the NCO-terminated prepolymer is selected from a range of preferably 15 to 50 wt %, more preferably 20 to 45 wt %, much more preferably 30 to 45 wt % based on the total weight of the urethane adhesive composition. Preferred typical examples of the urethane adhesive composition include adhesives for direct glazing such as the WS-222 of Yokohama Rubber Co., Ltd. and the Penguin Seal #560 of Sunstar Engineering Inc.

The thickness (Y) of the layer D is 0.9 to 14 mm. Preferably, when the length of the long side of the substrate forming the above layer A is represented by X (mm) and the thickness of the adhesive forming the layer D is represented by Y (mm), X and Y satisfy the following expressions (1) to (3).

$$0.9 \leq Y < 6 \text{ (when } 0 < X < 300) \quad (1)$$

$$3 \times 10^{-3} X \leq Y < 6 \text{ (when } 300 \leq X \leq 1500) \quad (2)$$

$$3 \times 10^{-3} X \leq Y < (16/3) \times 10^{-3} X - 2 \text{ (when } 1500 < X \leq 3000) \quad (3)$$

When the thickness of the adhesive is larger than the lower limit, sufficiently high adhesiveness is obtained advantageously and when the thickness is smaller than the upper limit, the weight of the adhesive becomes small with the result of low cost and little limitation to design advantageously. The upper limit values of the expressions (1) to (3) are according to Non-patent Document 1.

<Light-transmitting Substrate Layer: Layer A>

The light-transmitting substrate layer (layer A) is formed from a melt-extruded thermoplastic resin.

(Thermoplastic Resin)

Examples of the thermoplastic resin include polyolefin resins such as polyethylene and polypropylene, amorphous polyolefin resins such as polydicyclopentadiene, polycarbonate resins, acrylic resins such as polymethyl methacrylate, polyester resins such as polyethylene terephthalate, polybutylene terephthalate and poly(ethylene-2,6-naphthalate), polystyrene, polyarylate, polyether sulfone, polyether ether ketone, polyimide, phenol resin and urea resin. Out of these, polycarbonate resins, acrylic resins such as polymethyl methacrylate, polyester resins such as polyethylene terephthalate, polybutylene terephthalate and poly(ethylene-2,6-naphthalate), polystyrene, polypropylene, polyarylate and polyether sulfone all of which have excellent transparency are preferred. Further, polycarbonate resins having high impact strength are more preferred.

The polycarbonate resins may be polycarbonate resins having high heat resistance or a low water absorption coefficient obtained by polymerizing another dihydric phenol, or polycarbonate resins having high heat resistance obtained by polymerizing an aliphatic diol besides bisphenol A type polycarbonates. The polycarbonate resins may be produced by any production process. In the case of interfacial polycondensation, a monohydric phenol terminating agent is generally used. The polycarbonate resin may be a branched polycarbonate resin obtained by polymerizing a trifunctional phenol, or a copolycarbonate obtained by copolymerizing an aliphatic dicarboxylic acid, an aromatic dicarboxylic acid, or a divalent aliphatic alcohol or an alicyclic alcohol. When the viscosity average molecular weight of the polycarbonate resin falls within the range of 13,000 to 40,000, the polycarbonate resin can be used in a wide variety of fields. When the viscosity average molecular weight is lower than 20,000, the polycarbonate resin has excellent flowability and is therefore preferred for use in resin molded products which have a complicated shape or are large in size (such as backdoor windows) out of car resin windows and when the viscosity average molecular weight is 20,000 or more, the polycarbonate resin is excellent in strength and preferred for use in almost all car resin windows. In the car resin window which is a preferred application of the present invention, the molecular weight must be selected according to a target molded product. Since the resin plate of the present invention is thick, distortion at the time of molding falls within a permissible range even when the resin has a relatively high molecular weight. The upper limit of viscosity average molecular weight is preferably 35,000, more preferably 30,000 from the viewpoint of general versatility.

The above viscosity average molecular weight should be satisfied by a whole polycarbonate resin and may be satisfied by a mixture of two or more polycarbonate resins having different molecular weights. The mixing of a polycarbonate having a viscosity average molecular weight of more than 50,000 (preferably 80,000 or more, more preferably 100,000 or more) may be advantageous as it enhances entropic elasticity at the time of melting. For example, it is effective in the suppression of jetting in the present invention. The effect obtained by improving entropic elasticity becomes more pronounced as the molecular weight of the polycarbonate becomes higher. The upper limit of the molecular weight is actually 2,000,000, preferably 300,000, more preferably 200,000. When the polycarbonate resin is blended in an amount of 0.5 to 20 wt %, preferably 1 to 10 wt %, a predetermined effect is obtained without impairing moldability.

The viscosity average molecular weight (M) of the polycarbonate resin is obtained by inserting a specific viscosity ($\eta$sp) obtained at 20° C. from a solution prepared by dissolving 0.7 g of the polycarbonate resin in 100 ml of methylene chloride into the following equation. As for details of the polycarbonate resin, refer, for example, to JP-A 2002-129003.

$$\eta_{sp}/c = [\eta] + 0.45 \times [\eta]^2 c \text{ ([\eta] represents an intrinsic viscosity)}$$

$$[\eta] = 1.23 \times 10^{-4} M^{0.83}$$

$$c = 0.7$$

Preferred examples of the polycarbonate resins having high heat resistance or a low water absorption coefficient obtained by polymerizing another dihydric phenol are given below.

(1) A copolycarbonate which comprises 20 to 80 mol % (preferably 40 to 75 mol %, more preferably 45 to 65 mol %) of a 4,4'-(m-phenylenediisopropylidene)diphenol (to be abbreviated as "BPM" hereinafter) component and 20 to 80 mol % (preferably 25 to 60 mol %, more preferably 35 to 55 mol %) of a 9,9-bis(4-hydroxy-3-methylphenyl)fluorene (to be abbreviated as "BCF" hereinafter) component based on 100 mol % of the dihydric phenol component constituting the polycarbonate.

(2) A copolycarbonate which comprises 10 to 95 mol % (preferably 50 to 90 mol %, more preferably 60 to 85 mol %) of a bisphenol A component and 5 to 90 mol % (preferably 10 to 50 mol %, more preferably 15 to 40 mol %) of a BCF component based on 100 mol % of the dihydric phenol component constituting the polycarbonate.

(3) A copolycarbonate which comprises 20 to 80 mol % (preferably 40 to 75 mol %, more preferably 45 to 65 mol %) of the BPM component and 20 to 80 mol % (preferably 25 to 60 mol %, more preferably 35 to 55 mol %) of a 1,1-bis(4-hydroxyphenyl)-3,3,5-trimethylcyclohexane component, based on 100 mol % of the dihydric phenol component constituting the polycarbonate.

(4) A copolycarbonate which comprises 40 to 90 mol % (preferably 50 to 80 mol %) of a 2,2-bis(4-hydroxy-3-methylphenyl) propane (to be abbreviated to as "bisphenol C" hereinafter) component and 10 to 60 mol % (preferably 20 to 50 mol %) of the bisphenol A component based on 100 mol % of the dihydric phenol component constituting the polycarbonate.

Examples of the polycarbonate resins having high heat resistance obtained by polymerizing an aliphatic diol include polycarbonates obtained from isosorbide, isomannide and isoidide as the aliphatic diol constituting the polycarbonate. Out of these, polycarbonates obtained from isosorbide (1,4; 3,6-dianhydro-D-sorbitol) are particularly preferred because they are easily produced and have excellent heat resistance.

These special polycarbonates may be used alone or in combination of two or more. They may be mixed with a widely used bisphenol A type polycarbonate.

The production processes and characteristic properties of these special polycarbonates are detailed in, for example, JP-A 6-172508, JP-A 8-27370, JP-A 2001-55435 and JP-A 2002-117580.

The above thermoplastic resins may contain conventionally known additives as long as the above transparency is not impaired. The additives include a heat stabilizer, antioxidant, ultraviolet absorbent, optical stabilizer, colorant, release agent, sliding agent, infrared absorbent, light diffusing agent, fluorescent brightener, antistatic agent, flame retardant, flame retarding aid, plasticizer, reinforcing filler, impact modifier, photocatalyst-based antifouling agent and photochromic agent. The heat stabilizer, antioxidant, ultraviolet absorbent, optical stabilizer, colorant and release agent may be used in appropriate amounts which are conventionally known in the above thermoplastic resins.
(Coextrusion)

The light-transmitting substrate layer (layer A) may include a plurality of layers formed by coextrusion. The layer A preferably includes a polycarbonate resin layer (layer A1).

The layer A preferably includes an acrylic resin layer (layer A2). The acrylic resin layer (layer A2) has high interface adherence to the hard coat, layer (layer B) and obtains excellent weatherability advantageously.

The linear expansion coefficient of the acrylic resin layer (layer A2) is preferably $3\times10^{-5}$ to $80\times10^{-5}$/K, more preferably $3\times10^{-5}$ to $60\times10^{-5}$/K, much more preferably $3\times10^{-5}$ to $50\times10^{-5}$/K on average at 100 to 130° C. When the average value is smaller than the upper limit, the difference in expansion between the layer A2 and the hard coat layer (layer B) in the curing step and the use environment after that is small, thereby making it possible to prevent the deformation or cracking of the layer A2 and the cracking of the layer B.

The acrylic resin layer (layer A2) preferably contains an ultraviolet absorbent or immobilizes an ultraviolet absorbing group. The ultraviolet absorbent is preferred as it improves weatherability, and a benzotriazole-based or triazine-based ultraviolet absorbent which has a low photodecomposition rate and excellent durability is more preferred. A triazine-based ultraviolet absorbent is particularly preferred.

Examples of the benzotriazole-based ultraviolet absorbent include 2-(2-hydroxy-5-methylphenyl)benzotriazole, 2-(2-hydroxy-5-tert-octylphenyl)benzotriazole, 2-(2-hydroxy-3,5-dicumylphenyl)phenylbenzotriazole, 2-(2-hydroxy-3-tert-butyl-5-methylphenyl)-5-chlorobenzotriazole, 2,2'-methylenebis[4-(1,1,3,3-tetramethylbutyl)-6-(2N-benzotriazol-2-yl)phenol], 2-(2-hydroxy-3,5-di-tert-butylphenyl)benzotriazole, 2-(2-hydroxy-3,5-di-tert-butylphenyl)-5-chlorobenzotriazole, 2-(2-hydroxy-3,5-di-tert-amylphenyl)benzotriazole, 2-(2-hydroxy-5-tert-octylphenyl)benzotriazole, 2-(2-hydroxy-5-tert-butylphenyl)benzotriazole, 2-(2-hydroxy-4-octoxyphenyl) benzotriazole, 2,2'-methylenebis (4-cumyl-6-benzotriazolephenyl), 2,2'-p-phenylenebis(1,3-benzoxazin-4-one) and 2-[2-hydroxy-3-(3,4,5,6-tetrahydrophthalimidomethyl)-5-methylphenyl] benzotriazole.

Examples of the triazine-based ultraviolet absorbent include 2-(4,6-diphenyl-1,3,5-triazin-2-yl)-5-[(hexyl)oxy]-phenol and 2-(4,6-bis(2,4-dimethylphenyl)-1,3,5-triazin-2-yl)-5-[(octyl)oxy]-phenol.

These benzotriazole-based or triazine-based ultraviolet absorbents may be used alone or in combination of two or more. The amount of the ultraviolet absorbent contained in the acrylic, resin is preferably 0.3 to 35 parts by weight, more preferably 1 to 25 parts by weight, much more preferably 2 to 15 parts by weight based on 100 parts by weight of the acrylic resin.

When a layer having an acrylic resin layer (layer A2) such as a polymethyl methacrylate layer which is formed on the surface of the polycarbonate resin layer (layer A1) by coextrusion is used, interface adherence to the polycarbonate resin layer (layer A1) and the hard coat layer (layer B) becomes high, thereby enhancing weatherability advantageously.

Use of a layer having a layer of a polycarbonate resin containing a dihydroxy compound such as isosorbide which is formed on the surface of the polycarbonate resin layer (layer A1) by coextrusion is preferred from the viewpoints of excellent impact resistance and a small environmental load.
(Method of Forming Layer A1 and Layer A2)

A coextrusion method is preferably employed to form the acrylic resin layer (layer A2) on the polycarbonate resin layer (layer A1).

The coextrusion method employs an extrusion apparatus. In general, the extrusion apparatus is composed of one main extruder for extruding the polycarbonate resin constituting the substrate layer and one or more sub-extruders for extruding the acrylic resin constituting the coating layer, and the sub-extruders are smaller in size than the main extruder.

The temperature condition of the main extruder is generally 230 to 310° C., preferably 240 to 300° C., and the temperature condition of the sub-extruder is generally 200 to 300° C., preferably 210 to 290° C. To coat two or more molten resins, known means such as feed block system or multi-manifold system may be used. In this case, after the molten resins laminated in a feed block are guided to a sheet molding die such as a T die and molded into a sheet form, the resulting sheet flows into a molding roll (polishing roll) whose surface has been mirror-finished to form a bank. This molded sheet is mirror-finished and cooled while it passes through the molding roll to form a laminated sheet. In the case of the multi-manifold die, after the molten resins laminated in the die are molded into a sheet form in the die likewise, the resulting sheet is mirror-finished and cooled with the molding roll to form a laminated sheet. The temperature of the die is generally 220 to 300° C., preferably 230 to 290° C., and the temperature of the molding roll is generally 90 to 190° C., preferably 100 to 180° C. As the roll, a vertical roll or a horizontal roll may be suitably used.

The total thickness of the polycarbonate resin layer (layer A1) and the acrylic resin layer (layer A2) obtained by coextrusion is preferably 1 to 20 mm, more preferably 1 to 18 mm, particularly preferably 1 to 15 mm. Above the lower limit, deflection by a load from the outside becomes small, thereby obtaining excellent dimensional stability advantageously. Below the upper limit, the reduction of thickness and weight is not prevented and the exterior can be seen without distortion advantageously.

The (A1/A2) thickness ratio of the polycarbonate resin layer (layer A1) and the acrylic resin layer (layer A2) obtained by coextrusion is preferably 200 to 4, more preferably 100 to 9. Below the upper limit, sufficiently high weatherability and excellent abrasion resistance are obtained when the ultraviolet absorbent is contained in the layer A2. Above the upper limit, deformation caused by the softening of the thermoplastic resin hardly occurs when a thermosetting thin film layer is formed at a temperature between the Vicat softening temperatures of the polycarbonate resin and the thermosetting resin.

(Form of Light-transmitting Substrate Layer)

The length of the long side of the light-transmitting substrate layer (layer A) is preferably 150 to 3,000 mm, more preferably 300 to 2,500 mm. When the length of the long side is above the lower limit and below the upper limit, excellent adhesiveness is obtained at the time of bonding the laminate to a rigid structural member with the thickness of an adhesive which satisfies the above expressions (1) to (3). The long side of a sheet used in the substrate layer in the present invention means the longest side at the periphery of the sheet.

The thickness of the light-transmitting substrate layer (layer A) is preferably 1 to 9 mm. The lower limit of the thickness is more preferably 2 mm, much more preferably 3 mm. The upper limit of the thickness is more preferably 8 mm, much more preferably 7 mm.

When an acrylic resin is used to form the surface layer of the layer A by coextrusion, the thickness of the acrylic resin layer is preferably 10 to 300 μm, more preferably 20 to 200 μm. Above the lower limit, the thickness of the acrylic resin layer can be controlled advantageously and below the upper limit, the degradation of impact properties can be suppressed advantageously.

The maximum projection area of the light-transmitting substrate layer (layer A) is preferably 200 to 60,000 cm$^2$, more preferably 1,000 to 40,000 cm$^2$.

Further, the light-transmitting substrate layer (layer A) may have a curved surface. The curvature is preferably 500 to 30,000 mm, more preferably 1,000 to 25,000 mm, much more preferably 1,500 to 10,000 mm in terms of curvature radius (mm).

The above large-sized substrate and the substrate having a relatively mild curved surface exhibit a stress resisting effect more in the bonding part of the present invention.

<Black-out Layer: Layer E>

The laminate of the present invention may have a silk-screen printing layer or a two-color molded resin layer as a black-out layer (frame member, layer E) between the layer A and the layer B. The black-out is formed at the periphery of glazing and serves to hide the adhesive and the structural member formed at the periphery. The black-out part is preferably formed on one surface on either one of the first side (for example, car interior side) and the second side (for example, car exterior side) of the substrate (in this case, on the first side).

The black-out part, may be formed by the application of ink, the attachment of a colored sheet or the simultaneous molding or bonding of a molded product. To bond the black-out part, a bonding method such as adhesion (moisture-curing, reactive, photo-curing or pressure-sensitive type) or welding (thermal fusion, ultrasonic welding or laser welding) may be employed. A method of applying a body having adhesion ability and a method using a double-faced adhesive tape may also be used for the above object to be bonded.

(Application of Ink)

To form the black-out part by applying ink, various types of ink may be used. Since required properties are different according to a site where the black-out part is to be formed as described above, ink is selected in consideration of this. Vinyl chloride-vinyl acetate copolymer resin, acrylic resin, polycarbonate resin, polyester elastomer, two-pack type urethane resin composed of an acrylic polyol and polyisocyanate, and two-pack type urethane resin composed of a polyester polyol and polyisocyanate are preferred as ink binders from the viewpoint of affinity for a polycarbonate, resistance to a hard coating solution and following performance at the time of thermoforming. The ink binders may be used alone or in combination of two or more. Two-pack type urethane resins are preferred and a two-pack type urethane resin composed of an acrylic polyol and polyisocyanate is particularly preferred.

To form the black-out part by applying ink, various printing methods and coating methods such as spray coating and brush coating may be employed. The printing method is not particularly limited and the surface of a flat plate or a curved sheet may be printed by a conventionally known method. For example, spray printing, offset printing, flexo printing, gravure printing, screen printing and ink jet printing may be employed, out of which screen printing is most preferred.

(Two-color Molding)

To form the black-out part by the two-color molding or bonding of a molded product, the molded product may be formed from any one of plastics (including polymer alloy materials), fiber-reinforced plastics, mineral-reinforced plastics and fiber-reinforced composites (composite materials such as FRP, SMC and RTM made from glass fibers, aramid fibers, ceramic fibers and carbon fibers). The molded product may be reinforced by a steel material (steel plate), metal member such as aluminum alloy, magnesium alloy or titanium alloy, or another rigid member such as timber, and the weight of the molded product may be reduced by gas assist molding or foam molding. To injection mold a fiber-reinforced plastic, cascade molding based on a SVG method may be used.

The black-out layer (layer E) is formed from a resin composition which will be described hereinafter. The black-out layer (layer E) may be bonded to part of the peripheral surface of the light-transmitting substrate layer (layer A) but preferably bonded to all the surrounding part (peripheral part) of the light-transmitting substrate layer (layer A). That is, more preferably, the black-out layer (layer E) is a frame-like molded body which can be bonded to the peripheral part of the light-transmitting substrate layer (layer A). The black-out layer (layer E) and the light-transmitting substrate layer (layer A) are preferably bonded together in 10 to 90% of the area of the light-transmitting substrate layer (layer A). The area is more preferably 20 to 80%, much more preferably 30 to 70%.

Further, the black-out layer (layer E) can be bonded to one side or both sides of the light-transmitting substrate layer (layer A), preferably one side.

The (layer A/layer E) thickness ratio of the light-transmitting substrate layer (layer A) to the black-out layer (layer E) is preferably 0.1 to 10, more preferably 0.5 to 5, much more preferably 0.8 to 4. The absolute value of the thickness of the black-out layer (layer E) is preferably 0.1 to 10 mm, more preferably 0.5 to 5 mm, much more preferably 1 to 3 mm. The ratio and the thickness provide sufficiently high restraining force to warpage deformation caused by the thermal expansion of the light-transmitting substrate layer (layer A) with the result that excellent long-term properties are provided to the resin composition of the frame member.

The black-out layer (layer E) can be formed by molding the resin composition by various methods. The production methods include injection molding, extrusion molding, compression molding, blow molding and rotational molding, out of which injection molding is particularly preferred. The molded body may be further subjected to secondary processing.

(Resin of Black-out Layer)

The resin of the black-out layer used in the present invention has high stiffness (high flexural modulus), high toughness (high fracture elongation, high impact strength), excellent flowability and excellent heat, resistance. The resin preferably comprises 50 to 90 parts by weight, of an aromatic polycarbonate, 10 to 50 parts by weight of a styrene-based resin and 0 to 50 parts by weight of an inorganic filler from the viewpoints of heat resistance, flowability, impact resistance and stiffness. When the amount of the styrene-based resin is larger than the upper limit, heat resistance degrades and when the amount is smaller than the lower limit, flowability becomes unsatisfactory. The resin composition of the frame member preferably contains no olefin from the viewpoint of heat resistance.

The styrene-based resin means a resin composed of a polymer of an aromatic vinyl monomer or a copolymer obtained by copolymerizing an aromatic vinyl monomer with at least one selected from other monomers copolymerizable with the aromatic vinyl monomer and rubbery polymers (may be simply referred to as "styrene-based polymer" hereinafter). The styrene-based resin may be a mixture of a plurality of polymers or copolymers. A copolymer of the styrene-based resin contains at least 20 wt % of an aromatic vinyl monomer.

The resin composition for the black-out layer may contain a copolymer component in which segments of different polymers are bonded together, such as a compatibilizing agent which will be described hereinafter. In a copolymer containing a styrene-based polymer or an aromatic polycarbonate as a segment, the segment is reflected on composition ratio as a styrene-based resin or an aromatic polycarbonate resin. This is because it is considered that each segment of the copolymer component has at least the property of each polymer.

Examples of the aromatic vinyl monomer (may be referred to as "aromatic vinyl compound" hereinafter) used in the styrene-based resin include styrene, α-methylstyrene, o-methylstyrene, p-methylstyrene, vinyl xylene, ethyl styrene, dimethyl styrene, p-tert-butyl styrene, vinyl naphthalene, methoxy styrene, monobromostyrene, dibromostyrene, fluorostyrene and tribromostyrene, out of which styrene and α-methylstyrene are preferred and styrene is particularly preferred.

The monomers copolymerizable with the aromatic vinyl monomer are preferably vinyl cyanide compounds or (meth)acrylic acid ester compounds. The vinyl cyanide compounds include acrylonitrile and methacrylonitrile, out of which acrylonitrile is particularly preferred.

The (meth)acrylic acid ester compounds include methyl (meth)acrylate, ethyl (meth)acrylate, propyl (meth)acrylate, isopropyl (meth)acrylate, butyl (meth)acrylate, amy (meth) acrylate, hexyl (meth)acrylate, octyl (meth)acrylate, 2-ethylhexyl (meth)acrylate, cyclohexyl (meth)acrylate, dodecyl (meth)acrylate, octadecyl (meth)acrylate, phenyl (meth)acrylate and benzyl (meth) acrylate. The expression "(meth) acrylate" means both methacrylate and acrylate and the expression "(meth)acrylic ester" means both methacrylic acid ester and acrylic acid ester. Methyl methacrylate is particularly preferred as the (meth)acrylic acid ester compound.

Other vinyl monomers copolymerizable with the aromatic vinyl compound except for the vinyl cyanide compounds and the (meth)acrylic acid ester compounds include epoxy group-containing methacrylic acid esters such as glycidyl methacrylate, maleimide-based monomers such as maleimide, N-methylmaleimide and N-phenylmaleimide, and α,β-unsaturated carboxylic acids and anhydrides thereof such as acrylic acid, methacrylic acid, maleic acid, maleic anhydride, phthalic acid and itaconic acid.

As for the ratio of the aromatic vinyl monomer and the monomer copolymerizable with the above monomer, the amount of the aromatic vinyl monomer is 50 to 95 wt % (preferably 65 to 85 wt %) and the amount of the copolymerizable monomer is 5 to 50 wt % (preferably 15 to 35 wt %) based on 100 wt % of the total of the both. Out of the above copolymerizable monomers, vinyl cyanide compounds and (meth)acrylic acid ester compounds are preferred, and vinyl cyanide compounds are particularly preferred. That is, the styrene-based resin is preferably a copolymer resin containing a vinyl cyanide compound as a comonomer. A styrene-based resin composed of a copolymer of an aromatic vinyl monomer and a copolymerizable component which is substantially composed of a vinyl cyanide compound (particularly acrylonitrile) is more preferred. Especially when the styrene-based resin is a mixture of copolymers of a plurality of aromatic vinyl monomers and components copolymerizable with these monomers, all of these copolymers are preferably copolymers containing a vinyl cyanide compound as a comonomer, more preferably copolymers of an aromatic vinyl monomer and a copolymerizable component which is substantially composed of a vinyl cyanide compound (particularly acrylonitrile).

The styrene-based resin used in the present invention may have high stereoregularity like syndiotactic polystyrene by using a catalyst such as a metallocene catalyst at the time of its production. According to the circumstances, it may be a polymer or copolymer having a narrow molecular weight distribution, a block copolymer, or a polymer or copolymer having high stereoregularity, obtained by anion living polymerization or radical living polymerization. Further, as the copolymer of the styrene-based resin, there are widely known copolymers controlled precisely at each molecular level such as comb-like structured polymers controlled by using a macromonomer. As the styrene-based resin, these known copolymers which are precisely controlled may be used.

Examples of the styrene-based resin containing no rubbery polymer component out of the styrene-based resins include polystyrene resin, MS resin, AS resin and SMA resin. The MS resin is a copolymer resin comprising methyl methacrylate and styrene as main components, the AB resin is a copolymer resin comprising acrylonitrile and styrene as main components, and the SMA resin is a copolymer resin comprising styrene and maleic anhydride (MA) as main components.

The above styrene-based resin containing no rubbery polymer component is preferably AS resin or MS resin, particularly preferably AS resin. In the present invention, the AS resin refers to a thermoplastic copolymer obtained by copolymerizing a vinyl cyanide compound with an aromatic vinyl compound. Examples of the vinyl cyanide compound are given above, out of which acrylonitrile is particularly preferably used. Examples of the aromatic vinyl compound are given above, out of which styrene and α-methylstyrene are preferred and styrene is particularly preferred. As for the ratio of the components contained in the AS resin, the amount of the vinyl cyanide compound (particularly acrylonitrile) is 5 to 50 wt %, preferably 15 to 35 wt %, and the amount of the aromatic vinyl compound (particularly styrene) is 95 to 50 wt %, preferably 85 to 65 wt % based on 100 wt % of the total. Further, AS resin obtained by copolymerizing the above other copolymerizable compound with any one of these vinyl compounds may also be used. The content of the other compound is preferably not more than 15 wt % in the AS resin. Conventionally known initiators and chain transfer agents which are used in a reaction may be used as required.

The AS resin may be produced by bulk polymerization, suspension polymerization or emulsion polymerization, preferably bulk polymerization. Copolymerization may be carried out in a single stage or multiple stages. The weight average molecular weight of the AS resin is preferably 40,000 to 200,000 in terms of standard polystyrene when measured by GPC. The lower limit is more preferably 50,000, much more preferably 70,000. The upper limit is more preferably 160,000, much more preferably 150,000.

The styrene-based resin is preferably a styrene-based resin containing a copolymer (may be simply referred to as "rubber copolymerized styrene-based polymer" hereinafter) in which a polymer containing at least an aromatic vinyl monomer unit as a constituent unit is bonded to a rubbery polymer. The reasons for this are that the styrene-based resin containing the rubber copolymerized styrene-based polymer exhibits excellent toughness at a wide composition range and has excellent practical utility and that the styrene-based resin containing the rubber copolymerized styrene-based polymer exhibits the effect of the component C of the present invention markedly. Examples of the polymer bonded to a rubbery polymer include homopolymers of an aromatic vinyl compound and copolymers of an aromatic vinyl compound and a monomer copolymerizable with the compound as described above. The content and preferred mode of the monomer copolymerizable with the aromatic vinyl compound and the composition ratio of the monomer and the aromatic vinyl compound are as described above.

The above rubbery polymer is not particularly limited and refers to a polymer having a glass transition temperature of 10° C. or lower, preferably −10° C. or lower, more preferably −30° C. or lower. When the rubbery polymer is crosslinked rubber particles, the particles have a particle diameter of preferably 0.05 to 5 μm, more preferably 0.1 to 1.5 μm, much more preferably 0.1 to 0.8 μm in terms of weight average particle diameter. Within the above range, excellent impact resistance is achieved.

Examples of the rubbery polymer include diene-based rubbers (such as polybutadiene, polyisoprene, random copolymer and block copolymer of styrene and butadiene, acrylonitrile-butadiene copolymer, copolymer of an acrylic acid alkyl ester or methacrylic acid alkyl ester and butadiene, and butadiene-isoprene copolymer), olefin rubbers (such as copolymers of ethylene and an α-olefin, copolymers of ethylene and an unsaturated carboxylic acid ester, acrylic copolymers of ethylene and an aliphatic vinyl), acrylic rubbers (such as polybutyl acrylate, poly (2-ethylehxylacrylate) and copolymer of butyl acrylate and 2-ethylhexyl acrylate), and silicone rubbers (such as polyorganosiloxane rubber, IPN type rubber comprising a polyorganosiloxane rubber component and a polyalkyl(meth)acrylate rubber component; that is, rubber having a structure that two rubber components are intertwined with each other so that they cannot be separate from each other, and IPN rubber comprising an polyorganosiloxane rubber component and a polyisobutylene rubber component), out of which diene-based rubbers, olefin rubbers and acrylic rubbers are preferred.

The diene-based rubbers will be further explained. The diene-based rubber used in the rubbery polymer of the styrene-based resin is a rubber having a glass transition point of 10° C. or lower, such as polybutadiene, polyisoprene or styrene-butadiene copolymer. The amount of the diene-based rubber is preferably 5 to 80 wt %, more preferably 8 to 70 wt %, much more preferably 10 to 50 wt %, particularly preferably 12 to 40 wt % based on 100 wt % of the styrene-based resin component. The rubber particle diameter is preferably 0.05 to 5 μm, more preferably 0.1 to 1.5 μm, particularly preferably 0.1 to 0.8 μm. A rubber having a single rubber particle size distribution or a rubber particle size distribution with two or more mountains may be used, and a rubber whose rubber particles form a single phase or a rubber having a salami structure that an occluded phase is existent around each rubber particle in morphology may be used.

The olefin rubbers will be further explained. Examples of the olefin rubber used in the rubbery polymer of the styrene-based resin include copolymers of ethylene and an α-olefin (such as ethylene-propylene random copolymer and block copolymer, and ethylene-butene random copolymer and block copolymer), copolymers of ethylene and an unsaturated carboxylic acid ester (such as ethylene-methacrylate copolymer and ethylene-butyl acrylate copolymer), copolymers of ethylene and an aliphatic vinyl (such as an ethylene-vinyl acetate copolymer), and terpolymers of ethylene, propylene and an unconjugated diene (such as ethylene-propylene-hexadiene terpolymer). The olefin rubber is preferably a copolymer of ethylene and an α-olefin or a copolymer of ethylene, an α-olefin and an unconjugated polyene, particularly preferably a copolymer of ethylene, an α-olefin and an unconjugated polyene as it can obtain a crosslinked structure. The α-olefin has 3 to 60 carbon atoms, preferably 3 to 30 carbon atoms, more preferably 3 to 20 carbon atoms. These copolymers include copolymers obtained by hydrogenating copolymers of a conjugated diene compound. Examples of the rubber obtained by hydrogenation include a polyethylene unit produced by the hydrogenation of polybutadiene and a poly(ethylene-propylene) unit produced by the hydrogenation of polyisoprene.

The olefin rubber contains a crosslinked or uncrosslinked rubbery polymer but preferably a crosslinked rubbery polymer from the viewpoint of impact resistance. In this case, as for the ratio of the crosslinked rubbery polymer, the content of hot toluene insoluble matter is preferably not less than 30 wt %, more preferably not less than 50 wt %.

Further, the olefin rubber may be a mixture of two or more. An example thereof is a mixture of a copolymer of ethylene and an α-olefin and a rubbery polymer containing a copolymer of ethylene, an α-olefin and an unconjugated polyene and at least one selected from the group consisting of low-molecular weight polyethylene, a low-molecular weight ethylene-α-olefin copolymer, unsaturated carboxylic acid modified low-molecular weight polyethylene and an unsaturated carboxylic acid modified low-molecular weight ethylene-α-olefin copolymer.

Examples of the above α-olefin compound include propylene, 1-butane, 1-pentene, 1-hexene, 3-methyl-1-butene, 3-methyl-1-pentene, 3-ethyl-1-pentene, 4-methyl-1-pentene, 4-methyl-1-hexene, 4,4-dimethyl-1-hexene, 4,4-dimethyl-1-pentene, 4-ethyl-1-hexene, 3-ethyl-1-hexene, 1-octene, 1-decene, 1-dodecene, 1-tetradecene, 1-hexadecene, 1-octadecene and 1-eicosene. Out of these, propylene, 1-butene, 1-hexene and 1-octene are preferred, and propylene is more preferred.

Examples of the unconjugated polyene compound include 1,4-hexadiene, 5-ethylidene-2-norbornene, dicyclopentadiene, 5-vinylnorbornene, 6,7-dimethyl-4-ethylidene-1,6-octadiene, 6,7-dimethyl-4-ethylidene-1,6-nonadiene, 7-methyl-6-propyl-4-ethylidene-1,6-octadiene, 8-methyl-4-ethylidene-1,7-nonadiene, 7,8-dimethyl-4-ethylidene-1,7-nonadiene, 7,8-dimethyl-4-ethylidene-1,7-nonadiene, 9-methyl-4-ethylidene-1,8-decadiene and 8,9-dimethyl-4-ethylidene-1,8-decadiene.

In the copolymer of ethylene and an α-olefin and the copolymer of ethylene, an α-olefin and an unconjugated polyene, the (ethylene/α-olefin) molar ratio of ethylene and the α-olefin is preferably 40/60 to 95/5, more preferably 60/40 to 92/8, much more preferably 65/35 to 90/10. When this range is satisfied, excellent impact, resistance is obtained.

The iodine numbers of the copolymer of ethylene and an α-olefin and the copolymer of ethylene, an α-olefin and an unconjugated polyene are preferably 5 to 40, more preferably 10 to 30, much more preferably 10 to 20.

The copolymer of ethylene, an α-olefin and an unconjugated polyene is crosslinked as required after a linear polymer is synthesized. This crosslinking is carried out by using a conventionally known crosslinking method such as a radiation processing method using ionizing radiation or a heat treatment method using an organic peroxide. The rubbery polymer after crosslinking is particularly preferred as a rubber substrate for graft copolymerization.

The copolymer of ethylene and an α-olefin and the copolymer of ethylene, an α-olefin and an unconjugated polyene are generally manufactured by using a Ziegler catalyst. As another catalyst may be used a combination of a metallocene compound and an organic aluminumoxy compound.

Meanwhile, when the copolymer of ethylene and an α-olefin is produced by hydrogenating a polymer of a conjugated diene compound, the polymer of a conjugated diene compound is generally produced by using an ion polymerization catalyst such as butyl lithium and then hydrogenated to produce a predetermined rubbery polymer or a rubber copolymerized styrene-based polymer. For example, in the case of a SEPS polymer, a styrene-isoprene-styrene block copolymer is synthesized and then hydrogenated.

Examples of the conjugated diene compound include butadiene and isoprene. The conjugated diene compound is more preferably polyisoprene, polybutadiene or a copolymer of isoprene and butadiene. In the case of the copolymer, it is a random copolymer, block copolymer or tapered copolymer.

Although the molecular weight of the copolymer of ethylene and an α-olefin produced by hydrogenating a polymer of a conjugated diene compound is not limited, a copolymer having a number average molecular weight of 10,000 to 200,000 is preferred. A copolymer having a number average molecular weight of 15,000 to 150,000 is more preferred. Within the above range, excellent moldability is further provided.

A known catalyst, a known coupling agent, a known co-catalyst, a known polymerization method and a known solvent may be used for the production of a block copolymer containing a copolymer unit of ethylene and an α-olefin produced by hydrogenating a polymer of a conjugated diene compound.

The acrylic rubbers will be further explained. The alkyl (meth)acrylate monomer of the acrylic rubber used in the rubbery polymer of the styrene-based resin preferably has an alkyl group with 2 to 20 carbon atoms. Specific examples of an alkyl (meth)acrylate having an alkyl group with 2 to 5 carbon atoms (to be simply referred to as "C2~C5 acrylate" hereinafter) include ethyl acrylate, n-propyl acrylate, n-butyl acrylate and 4-hydroxybutyl acrylate. Examples of an alkyl (meth)acrylate having an alkyl group with 6 to 20 carbon atoms (to be simply referred to as "C6~C20 acrylate" hereinafter) include 2-ethylhexyl acrylate, ethoxyethoxy ethyl acrylate, methoxy tripropylene glycol acrylate, hexyl methacrylate, 2-ethylhexyl methacrylate, lauryl methacrylate, tridecyl methacrylate and stearyl methacrylate. N-butyl acrylate is preferred as the C2~C5 acrylate. Meanwhile, 2-ethylhexyl acrylate, ethoxyethoxy ethyl acrylate, methoxy tripropylene glycol acrylate, lauryl methacrylate, tridecyl methacrylate and stearyl methacrylate are preferred and 2-ethylhexyl acrylate is particularly preferred as the C6~C20 acrylate from the viewpoints of heat resistance and impact resistance. Out of these, n-butyl acrylate is most preferred. The reason for this is that n-butyl acrylate has good balance between heat resistance and impact resistance and is industrially easily acquired as it is widely used.

The above alkyl (meth)acrylate monomers may be used alone or in combination of two or more. Especially in the case of a combination, it is preferred to combine a C2~C5 acrylate and a C6~-C20 acrylate. This combination can improve both heat resistance and impact resistance. In the case of the combination, a method in which two or more components are copolymerized at the same time, a method in which any one of the monomers is polymerized to obtain a polymer which is then impregnated with another monomer to polymerize it, or a method in which these monomers are polymerized independently and the obtained polymers are mixed together may be employed. The method in which the polymer is impregnated with the monomer is particularly preferred. A combination in which the glass transition temperature of the obtained rubber substrate exhibits bimodal behavior in the DSC differential curve is more preferred.

Further, the acrylic rubber can achieve preferred rubber elasticity when a polyfunctional alkyl (meth)acrylate is polymerized together with the above alkyl (meth)acrylate monomer. Examples of the polyfunctional alkyl (meth) acrylate include allyl methacrylate, ethylene glycol dimethacrylate, propylene glycol dimethacrylate, 1,3-butylene glycol dimethacrylate, 1,4-butylene glycol dimethacrylate, divinyl benzene, triallyl cyanurate and triallyl isocyanurate. They may be used in combination of two or more. Allyl methacrylate and triallyl cyanurate are preferred, and allyl methacrylate is more preferred as the polyfunctional alkyl (meth)acrylate. The content of the polyfunctional alkyl (meth)acrylate in the rubbery polymer is preferably 0.1 to 20 wt %, more preferably 0.2 to 3 wt %, much more preferably 0.3 to 2.5 wt %.

When latex of a monomer having low water solubility is used in the acrylic rubber, it is preferably produced by forced emulsion polymerization. In this production process, means for atomizing the latex is a homomixer for atomizing the latex with shear force generated by high-speed revolution, a homogenizer for atomizing the latex with jet force generated by a high-pressure generator, or an apparatus for atomizing using a porous filter. In the styrene-based resin containing the rubber copolymerized styrene-based polymer of the present invention, the above aromatic vinyl monomer and the above other monomer copolymerizable with the aromatic vinyl monomer may be used and copolymerized with the rubbery polymer by a known method such as graft copolymerization or block copolymerization. Although the copolymerization method is not particularly limited, graft copolymerization and block copolymerization are preferred and graft copolymerization is particularly preferred as it can provide excellent toughness such as impact resistance.

Examples of the styrene-based resin containing the rubber copolymerized styrene-based polymer include styrene-butadiene-styrene copolymer resin (SBS resin), hydrogenated styrene-butadiene-styrene copolymer resin (hydrogenated SBS resin), hydrogenated styrene-isoprene-styrene copolymer resin (SEPS resin), acrylonitrile-butadiene-styrene copolymer resin (ABS resin), methyl methacrylate-butadiene-styrene copolymer resin (MBS resin), methyl methacrylate-acrylonitrile-butadiene-styrene copolymer resin (MABS resin), acrylonitrile-acrylic rubber-styrene copolymer resin (ASA resin), acrylonitrile-ethylene propylene-based rubber-styrene copolymer resin (AES) resin and mixtures thereof. The styrene-based resin of the present invention is generally commercialized and used as a mixture of a rubber copolymerized styrene-based polymer and a styrene-based polymer not bonded to a rubbery polymer. The styrene-based polymer not bonded to a rubbery polymer may be a free component not bonded by a bonding reaction with the rubbery polymer or a polymer component obtained by polymerization separately. It is widely known that most of commercially available styrene-based resin products (especially styrene-based resin of a graft copolymer) contain all of these components. Meanwhile, the polymer component obtained by polymerization separately may be mixed at the time of producing the resin composition of the present invention.

As the styrene-based resin containing a rubber copolymerized styrene-based polymer, SBS resin, ABS resin, MBS resin, ASA resin and AES resin are preferred, ABS resin, AES resin and ASA resin are more preferred, and AES resin and ASA resin are particularly preferred. There was a case where the effect of an acid modified polyolefin wax which is a component for improving the impact resistance of an aromatic polycarbonate resin containing an inorganic filler was relatively small in AES resin and ASA resin. Although the reason for this is not completely elucidated, it is considered that the effect of covering the inorganic filler might be unsatisfactory due to affinity between the acid modified polyolefin wax and AES resin or ASA resin. That is, since the acid modified polyolefin wax has low compatibility with the aromatic polycarbonate resin in general, when the wax existent in the polycarbonate resin phase during melt kneading comes into contact with the inorganic filler, it readily serves to cover the surface of the inorganic filler. However, it is possible that the covering function of the wax is hardly obtained since the wax has excellent compatibility with ASA resin or AES resin.

In ABS resin, AES resin and ASA resin, the content of the aromatic vinyl compound is preferably 95 to 50 wt %, more preferably 90 to 60 wt %, much more preferably 85 to 65 wt % based on 100 wt % of the total of the aromatic vinyl compound and the vinyl cyanide compound. Meanwhile, the content of the vinyl cyanide compound is preferably 5 to 50 wt %, more preferably 10 to 40 wt %, much more preferably 15 to 35 wt %. Further, methyl (meth)acrylate, ethyl acrylate, maleic anhydride or N-substituted maleimide may be mixed as part of the above graft component. The content of each of these components in the resin component is preferably not more than 15 wt %. In ABS resin, AES resin and ASA resin, conventionally known initiators, chain transfer agents and emulsifiers all of which are used in a reaction may be used as required.

Although the inorganic filler is not particularly limited, preferred examples thereof include fibrous fillers such as ceramic fibers, slag fibers, rock wool, wollastonite, xonotlite, potassium titanate whiskers, aluminum borate whiskers, boron whiskers and basic magnesium sulfate whiskers, and lamellar inorganic fillers such as talc, mica and hydrotalcite. These fibrous and lamellar inorganic fillers may be coated with a different material. Typical examples of the different material include metals, alloys and metal oxides.

Out of the above fibrous and lamellar inorganic fillers, wollastonite, whiskers (especially synthetic whiskers), metal fibers, talc and mica are preferred, and wollastonite, synthetic whiskers, talc and mica are more preferred from the viewpoints of high stiffness, high toughness (Izod impact properties, surface impact properties), appearance and dimensional stability. Wollastonite is particularly preferred from the viewpoint of adhesiveness to a HC layer. The synthetic whiskers include potassium titanate whiskers, aluminum borate whiskers, zinc oxide whiskers, basic magnesium sulfate whiskers and xonotlite.

<Structural Member>

The structural member to which the adhesive laminate of the present invention is to be attached is a structure or a part of a structure and refers to a support material carrying the load of another body or part, as exemplified by transport equipment bodies, panel modules fixed to the bodies, and window frames installed in the bodies. The transport equipment includes automobiles, trucks, trains, airplanes, ships, motorcycles, bicycles, wheel chairs, construction equipment and tractors. Examples of the structure as a structural member include structures such as buildings, outdoor fields, gymnasiums, arcades, carports, greenhouses and houses, road infrastructures such as sound barriers, windbreak walls and snow fences, display equipment such as signs, advertising displays and outside large monitors, and power-generating equipment, such as solar power generating devices.

The glazing combined body as used in the present invention refers to an integrated unit obtained by bonding the adhesive laminate of the present invention to a structural member. Examples of the structural member include members formed from metals, glass, ceramics, ceramic composites, fiber-reinforced plastics, fiber-reinforced composites (composite materials such as FRP, SMC and RTM comprising glass fibers, aramid fibers, ceramic fibers and carbon fibers) and wood. Examples of the metal members include steel materials (steel plates), and members formed from aluminum alloy, magnesium alloy and titanium alloy.

EXAMPLES

Examples 1 to 8, Comparative Examples 1 to 5

(I) Evaluation Items
(I-A) Measurement of Indentation Elasticity Modulus of Adhesive Primer by Nano-Indentation Method After an adhesive primer was applied to a hard coat layer on a polycarbonate substrate by using a BEMCOT wiper which was fully impregnated with a primer solution and cured for 1 week, the obtained primer layer was cut cross-sectionally with a microtome to measure the indentation elasticity modulus of the obtained smooth cross-section. The thickness of the adhesive primer layer was about 50 µm. The above measurement was made at the center part of the thickness of the primer layer. The indentation elasticity modulus measured by the nano-indentation method means a value when the thickness of the adhesive primer layer is 50 µm.

As for the measurement of the indentation elasticity modulus, an indentation test was made on the surface part of the obtained primer layer with an ultrafine indentation hardness tester (the ENT-2100 of ELIONIX INC.). At the time of indentation, the sample was placed under load at a loading speed of 20.4 mgf/sec, held under a maximum load of 800 µN for 1 second and unloaded at the same loading speed by using a Berkovich indenter ($\alpha$:65.03°). The results are shown in Table 1.

TABLE 1

| | Adhesive primer | | | |
|---|---|---|---|---|
| | GP-402 | MS-90 | PC-3 (for comparison) | Primer 35 (for comparison) |
| Indentation elasticity modulus (MPa) | 1199 | 3174 | 4250 | 5846 |

(I-B) Evaluation of Hand Peel Adhesion
(I-B-i) Preparation of Specimen

As shown in FIG. 1, an adhesive primer was applied to a 70 mm×50 mm laminate having a hard coat layer on a substrate layer with a BEMCOT wiper, and a moisture-curable polyurethane-based adhesive was applied to the primer layer with a triangle bead wire having a bottom side length of 8 mm and a height of 12 mm. Similarly, the thickness of the adhesive was reduced to an evaluation height by the laminate coated with the adhesive primer and then, the laminate was cured in a 23° C. 50% RH atmosphere for 1 week.

(I-B-ii) Stress Test

As shown in FIG. 1, the formed test specimen prepared in (I-B-i) was fixed to a stress testing jig, a displacement of 1 to 6 mm was applied to the laminate side, and the test specimen was kept in a 40° C. 100% RH thermohygrostat bath for 500 hours and in a 70° C. oven for 500 hours. After this, the test specimen was removed from the jig, the adhesive having a thickness of 2 mm was cut away at the boundary with a lower plate, and also the adhesive was cut away at a position where the thickness was 3 mm from an upper plate to be used for a hand peel adhesion test.

The displacement applied in the stress test was calculated by applying the equation (9) at page 392 of the above Non-patent Document 1 to a polycarbonate resin. That is, the following equation was applied.

$$\Delta l = l_0 \times \Delta \alpha \times \Delta T = l_0 \times 58 \times 10^{-6} \times 70 \approx 4 \times l_0 (mm)$$

In the above equation, $l_0$ is the long side length (m) of a substrate, $\Delta \alpha$ is a difference between the linear expansion coefficient ($12 \times 10^{-6} \times K^{-1}$) of steel and the linear expansion coefficient ($70 \times 10^{-6} \times K^{-1}$) of a polycarbonate resin, and $\Delta T$ is a temperature difference of 70° C. based on the assumption that the specimen is used at 20 to 90° C. according to the Non-Patent Document 1. Further, as described in the Non-patent Document 1, since the both ends of the bonded glazing move freely, the displacement applied to the adhesive is ½. Therefore, the assumed amount of displacement of the adhesive can be calculated as "2×$l_0$ (mm)". The relationship between the long side length of the substrate layer and the assumed amount of displacement calculated by this computation is shown in Table 2 (rounded to integers).

TABLE 2

| | Long side length (mm) of substrate layer | | | | | |
|---|---|---|---|---|---|---|
| | 500 | 1000 | 1500 | 2000 | 2500 | 3000 |
| Amount of displacement (mm) | 1 | 2 | 3 | 4 | 5 | 6 |

(I-B-iii) Hand Peel Adhesion Test

In the hand peel adhesion test, a cut was made in the adhesion interface with a cutter knife while an adhesive bead was pulled. "100" means that the area of cohesive failure of the adhesive is 100%. "80" means that the area of the cohesive failure of the adhesive is 80% and the area of interface destruction is 20%. The area of cohesive failure is preferably not less than 75%, more preferably 100%.

(II) Production of Substrate Layer
(II-1) Production of Polycarbonate Resin-A1

The process of producing the polycarbonate resin-A1 will be described based on the following symbols for the raw materials. 9.5 parts by weight of PC, 0.08 part by weight of VPG, 0.02 part by weight of SA, 0.03 part by weight of PEPQ, 0.05 part by weight of IRGN, 0.32 part by weight of UV1577 and $1 \times 10^{-4}$ part by weight of BL were uniformly mixed together by means of a super-mixer. 0.0001 part by weight of the obtained mixture and 90 parts by weight of PC were uniformly mixed together by means of a twin-cylinder mixer to obtain a pre-mixture to be supplied into an extruder.

The obtained pre-mixture was supplied into the extruder. The extruder in use was a vented double-screw extruder having a screw diameter of 77 mm (TEX77CHT (completely interlocking, unidirectional rotation, two screws) of The Japan Steel Works, Ltd.). The extruder had a kneading zone provided with a combination of a forward feed kneading disk and a back feed kneading disk in a section having an L/D of about 8 to 11 and a kneading zone provided with a feed kneading disk in a section having an L/D of about 16 to 17 when seen from the root of the screw. Further, the extruder had a back feed full-flight zone with an L/D of 0.5 right after the latter kneading zone. One vent port was formed in a section having an L/D of about 18.5 to 20. Extrusion conditions included a discharge rate of 320 kg/h, a screw revolution of 160 rpm and a vent vacuum degree of 3 kPa. The extrusion temperature was raised stepwise from 230° C. at a first feed port to 280° C. at a die.

A strand extruded from the die was cooled in a warm water bath and cut by a pelletizer to obtain pellets. When the pellets right after cutting passed through a vibration sieve in 10 seconds, long pellets which were not completely cut and chips which could be removed were removed.

(II-2) Production of Acrylic Resin-A2

The ACRYPET VH001 of Mitsubishi Rayon Co., Ltd. was used as a commercially available acrylic resin.

(III) Production of Molded Sheet
(III-1) Production of Coextrusion Sheet (A-1)

The above polycarbonate resin material-A1 and the above acrylic resin material-A2 were molten by means of a single-screw extruder, formed into a double-layer laminate by a feed block method and extruded from a T die having a set temperature of 290° C., and the obtained sheet was cooled with a mirror-finished roll to produce a laminate structure having an acrylic resin layer on one side of a polycarbonate resin layer. The extrusion temperature was raised stepwise from 280° C. and 220° C. at the first feed port to 290° C. and 240° C. at the die. The produced sheet had a width of 270 mm, a length of 2,000 mm and a total thickness of 3 mm, and the thickness of the acrylic resin layer was 100 µm. The obtained sheet was cut to prepare a 70 mm×50 mm test specimen.

(III-2) Production of Single-layer Sheet (A-2)

A pellet of the above resin material-A1 was injection press molded by using a large-sized molding machine having the four-axes parallelism control mechanism of a platen and capable of injection press molding (MDIP2100 of Meiki Co., Ltd., maximum mold clamping force of 33540 kN) to produce a molded sheet having a thickness of 5 mm, a length of 1,000 mm and a width of 600 mm. The obtained sheet was cut to prepare a 70 mm×50 mm test specimen.

(IV) Preparation of Coating Composition for Hard Coat Layer (IV-1) Preparation of Silicone Resin-based Hard Coating Agent (T-1)

0.1 part by weight of concentrated hydrochloric acid (12 M) was added to 100 parts by weight of a water-dispersible colloidal silica dispersion liquid (Cataloid SN-30 of Catalysts & Chemicals Industries Co., Ltd., solids content of 30 wt %) and stirred well. This dispersion liquid was cooled to 10° C., and 161 parts by weight of methyltrimethoxysilane was added dropwise to this dispersion liquid. Right after the addition of methyltrimethoxysilane, the temperature of the mixed solution began to rise by reaction heat and reached 60° C. in a few minutes after the start of addition. After 60° C. was reached, the temperature of the reaction solution was gradually reduced by cooling with an iced water bath. When the temperature of the reaction solution became 35° C., the reaction solution was stirred for 5 hours to keep this temperature, and 0.8 part by weight of a 45% choline methanol solution as a curing catalyst and 4.9 parts by weight of acetic acid as a pH control agent were mixed with this reaction solution to obtain a coating composition undiluted solution (α).

138 parts by weight of IPA was added to 209 parts by weight of the above coating composition undiluted solution (α) and stirred to obtain a coating composition T-1.

The total content of colloidal silica and the alkoxysilane hydrolysis condensate was 99 wt %.

(IV-2) Preparation of Ultraviolet-curable Acrylate Hard Coating Agent (T-2)

100 parts of a polyfunctional acrylate oligomer (U-15HA of Shin Nakamura Chemical Co., Ltd.), 5 parts of phenyl-1-hydroxycyclohexyl ketone (Irgacure184 of BASF SE), 250 parts of 1-methoxy-2-propanol, 100 parts of 2-propanol and 150 parts of organic solvent-dispersible colloidal silica (IPA-ST of Nissan Chemical Industries, Ltd., solid content of 30%) were mixed together to obtain an ultraviolet-curable acrylate hard coating agent (T-2).

The total content of colloidal silica and the alkoxysilane hydrolysis condensate was 30 wt %.

(IV-3) Preparation of Ultraviolet-curable Acrylate Hard Coating Agent (T-1)

100 parts of a polyfunctional acrylate oligomer (U-15HA of Shin Nakamura Chemical Co., Ltd.), 5 parts of phenyl-1-hydroxycyclohexyl ketone (Irgacure184 of BASF SE), 250 parts of 1-methoxy-2-propanol, 100 parts of 2-propanol and 38.9 parts of organic solvent-dispersible colloidal silica (IPA-ST of Nissan Chemical Industries, Ltd., solid content of 30%) were mixed together to obtain an ultraviolet-curable acrylate hard coating agent (T-3).

The total content of colloidal silica and the alkoxysilane hydrolysis condensate was 10 wt %.

(IV-4) Preparation of Ultraviolet-curable Acrylate Hard Coating Agent (T-4)

100 parts of a polyfunctional acrylate oligomer (U-15HA of Shin Nakamura Chemical Co., Ltd.), 5 parts of phenyl-1-hydroxycyclohexyl ketone (Irgacure184 of BASF SE), 250 parts of 1-methoxy-2-propanol, 100 parts of 2-propanol and 18.4 parts of organic solvent-dispersible colloidal silica (IPA-ST of Nissan Chemical Industries, Ltd., solid content of 30%) were mixed together to obtain an ultraviolet-curable acrylate hard coating agent (T-4).

The total content of colloidal silica and the alkoxysilane hydrolysis condensate was 5 wt %.

(IV-5) Preparation of Melamine Resin Hard Coating Agent (T-5)

100 parts of methylated methylol melamine (Cymel 301 of Japan Cytec Industries Inc.), 70 parts of 1,6-hexanediol, 5 parts of maleic acid, 150 parts of isopropyl alcohol, 320 parts of isobutyl alcohol and 25 parts of ethylene glycol monobutyl ether were mixed together to obtain a melamine resin hard coating agent (T-5).

The total content of colloidal silica and the alkoxysilane hydrolysis condensate was 0 wt %.

Examples 1 and 2, Comparative Example 1

The hard coating agent (T-1) prepared in (IV) was applied to the substrate layer (A-1) prepared in (II) to (III) by a dip coating technique to ensure that the film thickness became 5 µm after thermal curing, left to stand at 25° C. for 20 minutes and thermally cured at 130° C. for 60 minutes.

A laminate was manufactured by using the GP-402 primer for glass having a long-term open time of 1 month or more and containing a silane modified polyisocyanate which is a reaction product between γ-mercaptopropyltrimethoxysilane and polyisocyanate, another silane coupling agent, acrylic resin and epoxy resin (manufactured by Sunstar Engineering Inc.) as an adhesive primer and Penguin Seal #560 which is a moisture-curable one-pack type urethane adhesive (manufactured by Sunstar Engineering Inc.) as an elastic adhesive. The adhesive primer was applied by using a BEMCOT wiper which had been fully impregnated with a primer solution and lightly squeezed. The thickness of the adhesive was 2 to 8 mm. The obtained laminate was evaluated for hand peel adhesion described in (I-B) above. The results are shown in Table 3.

Example 3

The evaluation of hand peel adhesion described in (I-B) above was made under completely the same conditions as in Example 1 except that an urethane adhesive was applied after the adhesive primer was applied and kept in a 23° C. 50% Rh atmosphere for 3 months. In a case where the GP-402 primer for glass having a long-term open time of 1 month or more was used, even when the urethane adhesive was applied after the adhesive primer was applied and kept in a 23° C. 50% RH atmosphere for 3 months, almost the same result as in Example 1 in which the urethane adhesive was applied right after the adhesive primer was applied was obtained. The result is shown in Table 3.

Example 4

The hard coating agent (T-1) prepared in (IV) was applied to the substrate layer (A-1) prepared in (II) to (III) above by the dip coating technique to ensure that the film thickness became 5 μm after thermal curing, left to stand at 25° C. for 20 minutes and thermally cured at 130° C. for 60 minutes.

A laminate was manufactured by using the HAMATITE Glass Primer G (MS-90) not having a long-term open time of 1 month or more and containing a silane modified polyisocyanate which is a reaction product between γ-mercaptopropyltrimethoxysilane and polyisocyanate and a polyester polyurethane resin (manufactured by Yokohama Rubber Co., Ltd.) as an adhesive primer and WS-222 which is a moisture-curable one-pack type urethane adhesive (manufactured by Yokohama Rubber Co., Ltd.) as an elastic adhesive. The obtained laminate was cured for 1 week and treated at 90° C. for 24 hours to evaluate its hand peel adhesion described in (I-B) above. The result is shown in Table 3.

Comparative Example 2

The hard coating agent (T-1) prepared in (IV) was applied to the substrate layer (A-1) prepared in (II) to (III) above by the dip coating technique to ensure that the film thickness became 5 μm after thermal curing, left to stand at 25° C. for 20 minutes and thermally cured at 130° C. for 60 minutes.

A laminate was manufactured by using the HAMATITE Glass Primer G (PC-3) having a long-term open time of 1 month or more and containing no silane modified polyisocyanate (manufactured by Yokohama Rubber Co., Ltd.) as an adhesive primer and WS-222 which is a moisture-curable one-pack type urethane adhesive (manufactured by Yokohama Rubber Co., Ltd.) as an elastic adhesive to evaluate its hand peel adhesion described in (I-B) above. The result is shown in Table 3.

Comparative Example 3

The hard coating agent (T-1) prepared in (IV) was applied to the substrate layer (A-1) prepared in (II) to (III) above by the dip coating technique to ensure that the film thickness became 5 μm after thermal curing, left to stand at 25° C. for 20 minutes and thermally cured at 130° C. for 60 minutes.

A laminate was manufactured by using Primer 35 not having a long-term open time of 1 month or more (manufactured by Sunrise MSI Corporation) as an adhesive primer and SR Seal U-90W which is a moisture-curable one-pack type urethane adhesive (manufactured by Sunrise MSI Corporation) as an elastic adhesive to evaluate its hand peel adhesion described in (I-B) above. The result, is shown in Table 3.

Example 5

The evaluation of hand peel adhesion described in (I-B) above was carried out under completely the same conditions as in Example 1 except that the hard coating agent (T-2) prepared in (IV) was applied to the substrate layer (A-1) prepared in (II) to (III) above by the dip coating technique to ensure that the film thickness became 5 μm after ultraviolet curing, left to stand at 25° C. for 1 minute and at 80° C. for 1 minute and cured by exposure to ultraviolet light with a high-pressure mercury lamp to ensure that the integrated illuminance became 600 mJ/cm$^2$. The result is shown in Table 3.

Example 6

The evaluation of hand peel adhesion described in (I-B) above was carried out under completely the same conditions as in Example 1 except that the hard coating agent (T-3) prepared in (IV) was applied to the substrate layer (A-1) prepared in (II) to (III) above by the dip coating technique to ensure that the film thickness became 5 μm after ultraviolet curing, left to stand at 25° C. for 1 minute and at 80° C. for 1 minute and cured by exposure to ultraviolet light with a high-pressure mercury lamp to ensure that the integrated illuminance became 600 mJ/cm$^2$. The result is shown in Table 3.

Example 7

The evaluation of hand peel adhesion described in (I-B) above was carried out under completely the same conditions as in Example 1 except that the hard coating agent (T-2) prepared in (IV) was applied to the substrate layer (A-2) prepared in (II) to (III) above by the dip coating technique to ensure that the film thickness became 5 μm after ultraviolet curing, left to stand at 25° C. for 1 minute and at 80° C. for 1 minute and cured by exposure to ultraviolet light with a high-pressure mercury lamp to ensure that the integrated illuminance became 600 mJ/cm$^2$. The result is shown in Table 3.

Comparative Example 4

The evaluation of hand peel adhesion described in (I-B) above was carried out under completely the same conditions as in Example 1 except that the hard coating agent (T-4) prepared in (IV) was applied to the substrate layer (A-1) prepared in (II) to (III) above by the dip coating technique to ensure that the film, thickness became 5 μm after ultraviolet curing, left to stand at 25° C. for 1 minute and at 80° C. for 1 minute and cured by exposure to ultraviolet light with a high-pressure mercury lamp to ensure that the integrated illuminance became 600 mJ/cm$^2$. The result is shown in Table 3.

Comparative Example 5

The evaluation of hand peel adhesion described in (I-B) above was carried out under completely the same conditions as in Example 1 except that the hard coating agent (T-5) prepared in (IV) was applied to the substrate layer (A-1) prepared in (II) to (III) above by the dip coating technique to ensure that the film thickness became 5 μm after thermal curing, left to stand at 25° C. for 20 minutes and thermally cured at 120° C. for 60 minutes. The result is shown in Table 3.

Example 8

The above polycarbonate resin A1 and the above acrylic resin A2 prepared in (I) above were molten by means of a single-screw extruder, formed into a double-layer laminate by a feed block method and extruded from a T die having a set temperature of 290° C., and the obtained molded sheet was cooled to manufacture a molded sheet for glazing having an acrylic resin layer on one side of a polycarbonate resin layer. The extrusion temperature was raised stepwise from 280° C. and 220° C. at the first feed port to 290° C. and 240° C. at the die. The manufactured molded sheet had a width of 1,000 mm, a length of 1,000 m and a total thickness of 3 mm, and the thickness of the acrylic resin layer was 100 μm.

A part which would become a transparent part of the obtained molded sheet was masked to form a black-out layer having a width of about 160 mm and a thickness of about 20 μm at the periphery. The black-out layer was formed by using POS which is a two-pack type ink comprising an urethane resin containing an acrylic polyol and a polyisocyanate as a binder (a homogeneous mixture of 100 parts by weight of POS Screen Ink 911 black, 5 parts by weight of the 210 curing agent and 23 parts by weight of the P-003 solvent (raw materials are manufactured by Teikoku Ink Co., Ltd.)) with a spray gun, dried with air for 20 minutes and heated at 90° C. for 60 minutes to cure the ink. Thereafter, the masking was removed to obtain a molded sheet having a black-out layer. The ultraviolet-curable acrylate hard coating agent (T-2) prepared in the above Example (IV) was applied to both sides of the obtained sheet by using a coating robot in accordance with a flow coating technique to ensure that the film thickness became 4 μm after thermal curing, dried with air and heated at 130° C. for 60 minutes to be cured.

The GP-402 glass primer (of Sunstar Engineering Inc.) was applied to the peripheral part of the above molded sheet to a thickness of 8 μm, and the Penguin Seal #560 elastic adhesive (of Sunstar Engineering Inc.) was applied in a triangle having a width of 12 mm and a height of 15 mm. The molded sheet coated with the urethane adhesive was attached to a stainless steel frame coated with the HAMATITE Body Primer M (RC-50E) (of Yokohama Rubber Co., Ltd.) to a thickness of 8 μm to ensure that the thickness of the urethane adhesive became 6 mm. This thickness was adjusted by installing a spacer of the same thickness on the stainless steel frame. After the obtained adhesive structure was cured in a 23° C. 50% RH atmosphere for 1 week, it was placed in a 70° C. hot air drying furnace together with the frame to be treated for 1,000 hours. The adhesive structure was fixed without the separation of the adhesive.

TABLE 3

| | Amount of displacement (mm) | Long side length seen from amount of displacement (mm) | Treating conditions | Ex. 1 | Ex. 2 | Ex. 3 | Ex. 4 | Ex. 5 | Ex. 6 | Ex. 7 |
|---|---|---|---|---|---|---|---|---|---|---|
| Substrate layer (layer A) | | | | A-1 | A-1 | A-1 | A-1 | A-1 | A-1 | A-2 |
| Hard coat layer (layer B) | | | | T-1 | T-1 | T-1 | T-1 | T-2 | T-3 | T-2 |
| Adhesive primer layer (layer C) | | | | GP-402 | GP-402 | GP-402 | MS-90 | GP-402 | GP-402 | GP-402 |
| Thickness of adhesive primer layer (layer C) (μm) | | | | 8 | 1.5 | 8 | 8 | 8 | 8 | 8 |
| Thickness of adhesive layer (layer D) 8 mm | 1 | 500 | 40° C. 100% RH 500 hr | 100 | 100 | 100 | 100 | 100 | 100 | 100 |
| | | | 70° C. 500 hr | 100 | 100 | 100 | 100 | 100 | 100 | 100 |
| | 2 | 1000 | 40° C. 100% RH 500 hr | 100 | 100 | 100 | 100 | 100 | 100 | 100 |
| | | | 70° C. 500 hr | 100 | 100 | 100 | 100 | 100 | 100 | 100 |
| | 3 | 1500 | 40° C. 100% RH 500 hr | 100 | 100 | 100 | 100 | 100 | 100 | 100 |
| | | | 70° C. 500 hr | 100 | 100 | 100 | 100 | 100 | 100 | 100 |
| | 4 | 2000 | 40° C. 100% RH 500 hr | 100 | 100 | 100 | 100 | 100 | 90 | 100 |
| | | | 70° C. 500 hr | 100 | 100 | 100 | 100 | 100 | 75 | 100 |
| | 5 | 2500 | 40° C. 100% RH 500 hr | 100 | 90 | 100 | 90 | 100 | 0 | 100 |
| | | | 70° C. 500 hr | 100 | 75 | 100 | 75 | 100 | 0 | 100 |
| | 6 | 3000 | 40° C. 100% RH 500 hr | 100 | 0 | 100 | 0 | 100 | | 100 |
| | | | 70° C. 500 hr | 65 | 0 | 60 | 0 | 65 | | 65 |

| | Amount of displacement (mm) | Long side length seen from amount of displacement (mm) | Treating conditions | C. Ex. 1 | C. Ex. 2 | C. Ex. 3 | C. Ex. 4 | C. Ex. 5 |
|---|---|---|---|---|---|---|---|---|
| Substrate layer (layer A) | | | | A-1 | A-1 | A-1 | A-1 | A-1 |
| Hard coat layer (layer B) | | | | T-1 | T-1 | T-1 | T-4 | T-5 |
| Adhesive primer layer (layer C) | | | | GP-402 | PC-3 | Primer 35 | GP-402 | GP-402 |
| Thickness of adhesive primer layer (layer C) (μm) | | | | 0.5 | 8 | 8 | 8 | 8 |

TABLE 3-continued

| | Amount of displacement (mm) | Long side length seen from amount of displacement (mm) | Treating conditions | | |
|---|---|---|---|---|---|
| Thickness of adhesive layer (layer D) 8 mm | 1 | 500 | 40° C. 100% RH 500 hr | 0 | 100 |
| | | | 70° C. 500 hr | 0 | 100 |
| | 2 | 1000 | 40° C. 100% RH 500 hr | | 100 |
| | | | 70° C. 500 hr | | 100 |
| | 3 | 1500 | 40° C. 100% RH 500 hr | | 65 |
| | | | 70° C. 500 hr | | 98 |
| | 4 | 2000 | 40° C. 100% RH 500 hr | | 0 |
| | | | 70° C. 500 hr | | 0 |
| | 5 | 2500 | 40° C. 100% RH 500 hr | | |
| | | | 70° C. 500 hr | | |
| | 6 | 3000 | 40° C. 100% RH 500 hr | | |
| | | | 70° C. 500 hr | | |

| | Amount of displacement (mm) | Long side length seen from amount of displacement (mm) | Treating conditions | Ex. 1 | Ex. 2 | Ex. 3 | Ex. 4 | Ex. 5 | Ex. 6 | Ex. 7 |
|---|---|---|---|---|---|---|---|---|---|---|
| Substrate layer (layer A) | | | | A-1 | A-1 | A-1 | A-1 | A-1 | A-1 | A-2 |
| Hard coat layer (layer B) | | | | T-1 | T-1 | T-1 | T-1 | T-2 | T-3 | T-2 |
| Adhesive primer layer (layer C) | | | | GP-402 | GP-402 | GP-402 | MS-90 | GP-402 | GP-402 | GP-402 |
| Thickness of adhesive primer layer (layer C) (μm) | | | | 8 | 1.5 | 8 | 8 | 8 | 8 | 8 |
| Thickness of adhesive layer (layer D) 6 mm | 1 | 500 | 40° C. 100% RH 500 hr | 100 | 100 | 100 | 100 | 100 | 100 | 100 |
| | | | 70° C. 500 hr | 100 | 100 | 100 | 100 | 100 | 100 | 100 |
| | 2 | 1000 | 40° C. 100% RH 500 hr | 100 | 100 | 100 | 100 | 100 | 100 | 100 |
| | | | 70° C. 500 hr | 100 | 100 | 100 | 100 | 100 | 100 | 100 |
| | 3 | 1500 | 40° C. 100% RH 500 hr | 100 | 100 | 100 | 100 | 100 | 100 | 100 |
| | | | 70° C. 500 hr | 100 | 100 | 100 | 100 | 100 | 100 | 100 |
| | 4 | 2000 | 40° C. 100% RH 500 hr | 100 | 100 | 100 | 90 | 100 | 65 | 100 |
| | | | 70° C. 500 hr | 100 | 100 | 100 | 75 | 100 | 30 | 100 |
| | 5 | 2500 | 40° C. 100% RH 500 hr | 100 | 65 | 100 | 0 | 100 | 0 | 100 |
| | | | 70° C. 500 hr | 50 | 5 | 45 | 0 | 50 | 0 | 50 |
| | 6 | 3000 | 40° C. 100% RH 500 hr | 100 | 0 | 100 | | 100 | | 100 |
| | | | 70° C. 500 hr | 5 | 0 | 5 | | 5 | | 5 |

| | Amount of displacement (mm) | Long side length seen from amount of displacement (mm) | Treating conditions | C. Ex. 1 | C. Ex. 2 | C. Ex. 3 | C. Ex. 4 | C. Ex. 5 |
|---|---|---|---|---|---|---|---|---|
| Substrate layer (layer A) | | | | A-1 | A-1 | A-1 | A-1 | A-1 |
| Hard coat layer (layer B) | | | | T-1 | T-1 | T-1 | T-4 | T-5 |
| Adhesive primer layer (layer C) | | | | GP-402 | PC-3 | Primer 35 | GP-402 | GP-402 |
| Thickness of adhesive primer layer (layer C) (μm) | | | | 0.5 | 8 | 8 | 8 | 8 |
| Thickness of adhesive layer (layer D) 6 mm | 1 | 500 | 40° C. 100% RH 500 hr | 30 | 0 | 100 | 20 | 0 |
| | | | 70° C. 500 hr | 20 | 0 | 100 | 20 | 0 |
| | 2 | 1000 | 40° C. 100% RH 500 hr | 5 | | 100 | 5 | |
| | | | 70° C. 500 hr | 0 | | 100 | 0 | |

TABLE 3-continued

| | | | | | | | | | | | |
|---|---|---|---|---|---|---|---|---|---|---|---|
| | 3 | 1500 | 40° C. 100% RH 500 hr | 0 | | | | | 60 | 0 | |
| | | | 70° C. 500 hr | 0 | | | | | 98 | 0 | |
| | 4 | 2000 | 40° C. 100% RH 500 hr | | | | | | 0 | | |
| | | | 70° C. 500 hr | | | | | | 0 | | |
| | 5 | 2500 | 40° C. 100% RH 500 hr | | | | | | | | |
| | | | 70° C. 500 hr | | | | | | | | |
| | 6 | 3000 | 40° C. 100% RH 500 hr | | | | | | | | |
| | | | 70° C. 500 hr | | | | | | | | |

| | Amount of displacement (mm) | Long side length seen from amount of displacement (mm) | Treating conditions | Ex. 1 | Ex. 2 | Ex. 3 | Ex. 4 | Ex. 5 | Ex. 6 | Ex. 7 |
|---|---|---|---|---|---|---|---|---|---|---|
| Substrate layer (layer A) | | | | A-1 | A-1 | A-1 | A-1 | A-1 | A-1 | A-2 |
| Hard coat layer (layer B) | | | | T-1 | T-1 | T-1 | T-1 | T-2 | T-3 | T-2 |
| Adhesive primer layer (layer C) | | | | GP-402 | GP-402 | GP-402 | MS-90 | GP-402 | GP-402 | GP-402 |
| Thickness of adhesive primer layer (layer C) (μm) | | | | 8 | 1.5 | 8 | 8 | 8 | 8 | 8 |
| Thickness of adhesive layer (layer D) 4 mm | 1 | 500 | 40° C. 100% RH 500 hr | 100 | 100 | 100 | 100 | 100 | 100 | 100 |
| | | | 70° C. 500 hr | 100 | 100 | 100 | 100 | 100 | 100 | 100 |
| | 2 | 1000 | 40° C. 100% RH 500 hr | 100 | 90 | 100 | 100 | 100 | 50 | 100 |
| | | | 70° C. 500 hr | 100 | 75 | 100 | 100 | 100 | 30 | 100 |
| | 3 | 1500 | 40° C. 100% RH 500 hr | 0 | 0 | 0 | 0 | 0 | 0 | 0 |
| | | | 70° C. 500 hr | 0 | 0 | 0 | 0 | 0 | 0 | 0 |
| Thickness of adhesive layer (layer D) 2 mm | 1 | 500 | 40° C. 100% RH 500 hr | 100 | 90 | 100 | 100 | 100 | 50 | 100 |
| | | | 70° C. 500 hr | 100 | 75 | 100 | 100 | 100 | 30 | 100 |
| | 2 | 1000 | 40° C. 100% RH 500 hr | 0 | 0 | 0 | 0 | 0 | 0 | 0 |
| | | | 70° C. 500 hr | 0 | 0 | 0 | 0 | 0 | 0 | 0 |

| | Amount of displacement (mm) | Long side length seen front amount of displacement (mm) | Treating conditions | C. Ex. 1 | C. Ex. 2 | C. Ex. 3 | C. Ex. 4 | C. Ex. 5 |
|---|---|---|---|---|---|---|---|---|
| Substrate layer (layer A) | | | | A-1 | A-1 | A-1 | A-1 | A-1 |
| Hard coat layer (layer B) | | | | T-1 | T-1 | T-1 | T-4 | T-5 |
| Adhesive primer layer (layer C) | | | | GP-402 | PC-3 | Primer 35 | GP-402 | GP-402 |
| Thickness of adhesive primer layer (layer C) (μm) | | | | 0.5 | 8 | 8 | 8 | 8 |
| Thickness of adhesive layer (layer D) 4 mm | 1 | 500 | 40° C. 100% RH 500 hr | 10 | 0 | 100 | 10 | 0 |
| | | | 70° C. 500 hr | 5 | 0 | 100 | 5 | 0 |
| | 2 | 1000 | 40° C. 100% RH 500 hr | 0 | | 0 | 0 | |
| | | | 70° C. 500 hr | 0 | | 0 | 0 | |
| | 3 | 1500 | 40° C. 100% RH 500 hr | | | | | |
| | | | 70° C. 500 hr | | | | | |

TABLE 3-continued

| | | | | | | | | |
|---|---|---|---|---|---|---|---|---|
| Thickness of adhesive layer (layer D) 2 mm | 1 | 500 | 40° C. 100% RH 500 hr 70° C. 500 hr | 0 | 0 | 0 | 0 | 0 |
| | 2 | 1000 | 40° C. 100% RH 500 hr 70° C. 500 hr | 0 | 0 | 0 | 0 | 0 |

Ex.: Example
C. Ex.: Comparative Example

Examples 9 to 18, Comparative Examples 6 to 9

(1) Evaluation Items
(I-A) Measurement of Indentation Elasticity Modulus of Adhesive Primer by Nano-indentation Method After an adhesive primer was applied to a hard coat layer on a polycarbonate substrate by using a BEMCOT wiper which was fully impregnated with a primer solution and cured for 1 week, the obtained primer layer was cut cross-sectionally with a microtome to measure the indentation elasticity modulus of the obtained smooth cross-section. The thickness of the adhesive primer layer was about 50 μm. The above measurement was made at the center part of the thickness of the primer layer. The indentation elasticity modulus measured by the nano-indentation method means a value when the thickness of the adhesive primer layer is 50 μm.

As for the measurement of the indentation elasticity modulus, an indentation test was made on the surface part of the obtained primer layer with an ultrafine indentation hardness tester (the ENT-2100 of ELIONIX INC.). At the time of indentation, the sample was placed under load at a loading speed of 20.4 mgf/sec, held under a maximum load of 800 μN for 1 second and unloaded at the same loading speed by using a Berkovich indenter (α:65.03°). The results are shown in Table 4.

TABLE 4

| | C1 | C2 | C3 (for Comparison) | C4 (for comparison) | C5 (for comparison) |
|---|---|---|---|---|---|
| Adhesive primer | GP-402 | MS-90 | PC-3 | Primer 35 | RC-50E |
| Indentation elasticity modulus (MPa) | 1199 | 3174 | 4250 | 5846 | 6918 |

(I-B) Evaluation of Hand Peel Adhesion
(I-B-i) Preparation of Specimen

Figure 4:
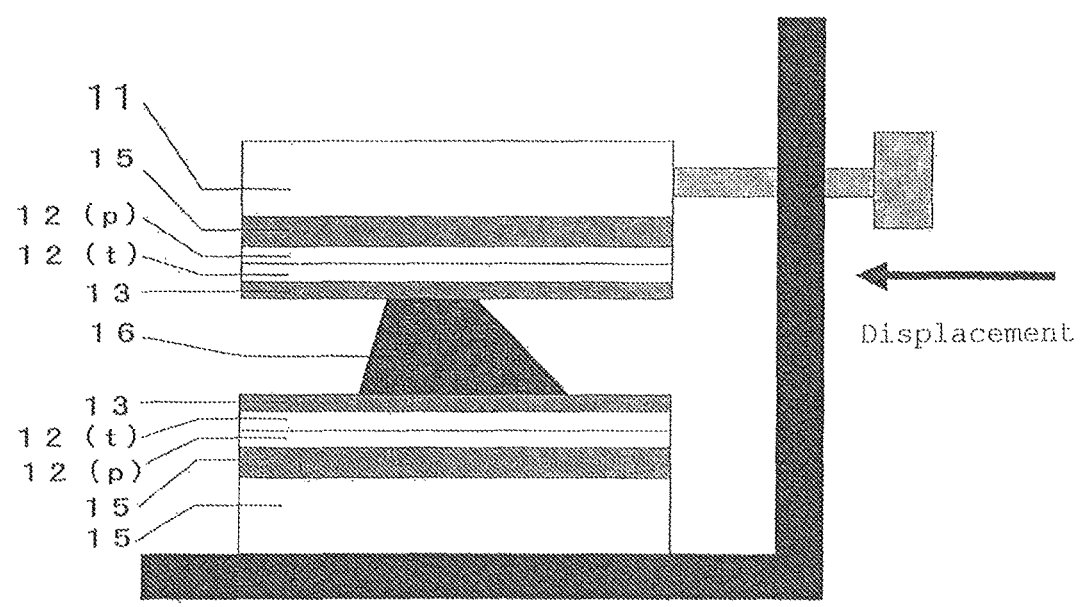
FIG. 4 illustrates a laminate manufactured in Examples 9 to 17 and Comparative Examples 6 to 9 and a stress test.

As shown in FIG. 4, an adhesive primer was applied to a 70 mm×50 mm laminate having a hard coat layer on a substrate layer with a BEMCOT wiper, and a moisture-curable polyurethane-based adhesive was applied to the primer layer with a triangle bead wire having a bottom side length of 8 mm and a height of 12 mm. Similarly, the thickness of the adhesive was reduced to an evaluation height of 8 mm by the laminate coated with the adhesive primer and then, the laminate was cured in a 23° C. 50% RH atmosphere for 1 week. Further, the thickness of the adhesive was reduced to 6 mm to prepare a specimen likewise.

(I-B-ii) Stress Test

As shown in FIG. 4, the test specimen prepared in (I-B-i) was fixed to a stress testing jig, a displacement of 1 to 4 mm was applied to the laminate, and the test specimen was kept in a 70° C. oven for 500 hours. After storage, the test specimen was removed from the jig, and the adhesive was cut away at a position where the thickness was 3 mm from an upper plate to be used for a hand peel adhesion test.

The displacement applied in the stress test was calculated by applying the equation (9) at page 392 of the above Non-patent. Document 1 to a polycarbonate resin. That is, the following equation was applied.

$$\Delta l = l_0 \times \Delta\alpha \times \Delta T = l_0 \times 58 \times 10^{-6} \times 70 \approx 4 \times l_0 \text{ (mm)}$$

In the above equation, $l_0$ is the long side length (m) of a substrate, $\Delta\alpha$ is a difference between the linear expansion coefficient ($12 \times 10^{-6} \times K^{-1}$) of steel and the linear expansion coefficient ($70 \times 10^{-6} \times K^{-1}$) of a polycarbonate resin, and $\Delta T$ is a temperature difference of 70° C. based on the assumption that the specimen is used at 20 to 90° C. according to the Non-Patent Document 1. Further, as described in the Non-patent Document 1, since the both ends of the bonded glazing move freely, the displacement applied to the adhesive is ½. Therefore, the assumed amount of displacement of the adhesive can be calculated as "$2 \times l_0$ (mm)". The relationship between the long side length of the substrate layer and the assumed amount of displacement calculated by this computation is shown in Table 5 (rounded to integers).

TABLE 5

| | Long side length (mm) of substrate layer | | | | | |
|---|---|---|---|---|---|---|
| | 500 | 1000 | 1500 | 2000 | 2500 | 3000 |
| Amount of displacement (mm) | 1 | 2 | 3 | 4 | 5 | 6 |

(I-B-iii) Hand Peel Adhesion Test

In the hand peel adhesion test, a cut was made in the adhesion interface with a cutter knife while an adhesive bead was pulled. "100" means that the area of cohesive failure of the adhesive is 100%. "80" means that the area of the cohesive failure of the adhesive is 80% and the area of interface destruction is 20%. The area of cohesive failure is preferably not less than 75%, more preferably 100%.

(II-1) Production of Polycarbonate Resin-A1

The process of producing the polycarbonate resin-A1 will be described based on the following symbols for the raw materials. 9.5 parts by weight of PC, 0.08 part by weight of VPG, 0.02 part by weight of SA, 0.03 part by weight of PEPQ, 0.05 part by weight of IRGN, 0.32 part by weight of UV1577 and $1 \times 10^{-4}$ part by weight of BL were uniformly mixed together by means of a super-mixer. 10.0001 parts by weight of the obtained mixture and 90 parts by weight of PC were uniformly mixed together by means of a twin-cylinder mixer to obtain a pre-mixture to be supplied into an extruder.

The obtained pre-mixture was supplied into the extruder. The extruder in use was a vented double-screw extruder having a screw diameter of 77 mm (TEX77CHT (completely interlocking, unidirectional rotation, two screws) of The Japan Steel Works, Ltd.). The extruder had a kneading zone provided with a combination of a forward feed kneading disk and a back feed kneading disk in a section having an L/D of about 8 to 11 and a kneading zone provided with a feed kneading disk in a section having an L/D of about 16 to 17 when seen from the root of the screw. Further, the extruder had a back feed full-flight zone with an L/D of 0.5 right after the latter kneading zone. One vent port was formed in a section having an L/D of about 18.5 to 20. Extrusion conditions included a discharge rate of 320 kg/h, a screw revolution of 160 rpm and a vent vacuum degree of 3 kPa. The extrusion temperature was raised stepwise from 230° C. at a first feed port to 280° C. at a die.

A strand extruded from the die was cooled in a warm water bath and cut by a pelletizer to obtain pellets. When the pellets right after cutting passed through a vibration sieve in 10 seconds, long pellets which were not completely cut and chips which could be removed were removed.

(II-2) Production of Polycarbonate Resin-A2

The process of producing the polycarbonate resin-A2 will be described based on the following symbols for the raw materials. 4.25 parts by weight of PC1, 0.1 part by weight of VPG, 0.02 part by weight of SA, 0.03 part by weight of PEPQ, 0.05 part by weight of IRGN, 0.3 part by weight of UV1577, 0.25 part by weight of YMDS and 5 parts by weight of CM were uniformly mixed together by means of a super-mixer. A pellet resin material-A2 was obtained in the same manner as the production of the above resin material-A1 except that 10 parts by weight of the obtained mixture and 90 parts by weight of PC were uniformly mixed together by means of a twin-cylinder mixer to obtain a pre-mixture to be supplied into an extruder.

The raw materials in use are given below.
PC1: polycarbonate resin powder having a viscosity average molecular weight of 23,700, produced from bisphenol A and phosgene by interfacial polycondensation (Panlite L-1250WP (trade name) of Teijin Chemicals Ltd.)
VPG: full ester of pentaerythritol and an aliphatic carboxylic acid (comprising stearic acid and palmitic acid as main components) (Roxiol VPG861 of Cognis Japan Co., Ltd.)
SA: fatty acid partial ester (Rikemal S-100A of Riken Vitamin Co., Ltd.)
PEPQ: phosphonite-based heat stabilizer (Irgafos P-EPQ of BASF SE)
IRGN: hindered phenol-based antioxidant (Irganox 1076 of BASF SE)
UV1577:
2-(4,6-diphenyl-1,3,5-triazin-2-yl)-5-[(hexyl)oxy]phenol (Tinuvin1577 of BASF SE)
CM: colorant master batch prepared by uniformly mixing together 4.99489 parts by weight of the above PC, 0.00313 part by weight of NB5856T, 0.00071 part by weight of R8370 and 0.00127 part by weight of R8370 by means of a super-mixer. NB5856T is a black dye (NUBIAN BLACK 5856T of Orient Chemical Industries Co., Ltd.), and R8350 and R8370 are red dyes (PLAST Red 8350 and PLAST Red 8370 of Arimoto Chemical Co., Ltd.)
YMDS: infrared shielding agent comprising an organic dispersion resin and about 23 wt % of $Cs_{0.33}WO_3$ (average particle diameter of 5 nm) as an inorganic infrared absorbent (YMDS-874 of Sumitomo Metal Mining Co., Ltd.)

(III-1) Production of Resin Composition-E1 for Use in Frame Member (Black-out Layer)

The process of producing the frame material-E1 will be described based on the following symbols for the raw materials. 75 parts by weight of PC2, 12 parts by weight of ABS1, 3 parts by weight of MB, 10 parts by weight, of WRN1, 0.1 part by weight of M and 0.8 part by weight of CB were uniformly mixed together by means of a twin-cylinder mixer. The obtained mixture was supplied into the first feed port at the root of the screw of a vented double-screw extruder having a screw diameter of 30 mm (KTX-30 of Kobe Steel, Ltd.) and extruded at cylinder and die temperatures of 260° C., a screw revolution of 180 rpm, a discharge rate of 15 kg/hr and a vent suction degree of 3,000 Pa to obtain a strand. Subsequently, the strand was cooled in a warm water bath and cut by a pelletizer to obtain a pellet resin material E1.

(III-2) Production of Resin Composition-E2 for Use in Frame Member (Black-out Layer)

The process of producing the frame material-E2 will be described based on the following symbols for the raw materials. 65 parts by weight of PC2, 30 parts by weight of ABS2, 5 parts by weight of MB, 0.3 part by weight of E, 0.3 part by weight of UV701 and 0.8 part by weight of CB were uniformly mixed together by means of a twin-cylinder mixer. The obtained mixture was supplied into the first feed port at the root of the screw of a vented double-screw extruder having a screw diameter of 30 mm (KTX-30 of Kobe Steel, Ltd.) and extruded at cylinder and die temperatures of 260° C., a screw revolution of 180 rpm, a discharge rate of 15 kg/hr and a vent suction degree of 3,000 Pa to obtain a strand. Subsequently, the strand was cooled in a warm water bath and cut by a pelletizer to obtain a pellet resin material E2.

(III-3) Production of Resin Composition-E3 for Use in Frame Member (Black-out Layer)

The process of producing the frame material-E3 will be described based on the following symbols for the raw materials. 60 parts by weight of PC3, 25 parts by weight of PET, 3 parts by weight of PBT, 10 parts by weight of WRN2, 3 parts by weight of MB, 0.6 part by weight of DC, 0.2 part by weight of PEP, 0,02 part by weight of M, 0.3 part by weight of UV701 and 0.8 part by weight of CB were uniformly mixed together by means of a twin-cylinder mixer. The obtained mixture was supplied into the first feed port at the root of the screw of a vented double-screw extruder having a screw diameter of 30 mm (KTX-30 of Kobe Steel, Ltd.) and extruded at cylinder and die temperatures of 270° C., a screw revolution of 180 rpm, a discharge rate of 15 kg/hr and a vent suction degree of 3,000 Pa to obtain a strand. Subsequently, the strand was cooled in a warm water bath and cut by a pelletizer to obtain a pellet resin material E3.

(III-4) Production of Resin Composition-E4 for Use in Frame Member (Black-out Layer)

The process of producing the frame material-E4 will be described based on the following symbols for the raw materials. 75 parts by weight of PC2, 12 parts by weight of ABS1, 3 parts by weight of MB, 10 parts by weight of TALC, 0.1 part by weight of M and 0.8 part by weight of CB were uniformly mixed together by means of a twin-cylinder mixer. The obtained mixture was supplied into the first feed port at the root of the screw of a vented double-screw extruder having a screw diameter of 30 mm (KTX-30 of Kobe Steel, Ltd.) and extruded at cylinder and die temperatures of 260° C., a screw revolution of 180 rpm, a discharge rate of 15 kg/hr and a vent suction degree of 3,000 Pa to obtain a strand. Subsequently, the strand was cooled in a warm water bath and cut by a pelletizer to obtain a pellet resin material E4.

The raw materials in use are given below.
PC2: polycarbonate resin powder having a viscosity average molecular weight of 22,400, produced from bisphenol A and phosgene by interfacial polycondensation (Panlite L-1225WP (trade name) of Teijin Chemicals Ltd.)

PC3: polycarbonate resin powder having a viscosity average molecular weight of 19,700, produced from bisphenol A and phosgene by interfacial polycondensation (Panlite L-1225WX (trade name) of Teijin Chemicals Ltd.)

ABS1: ABS resin comprising about 18 wt % of a butadiene rubber component, having a weight average rubber particle diameter of 0.8 μm, and produced by bulk polymerization (AT-05 of Nippon A&L Inc.)

ABS2: ABS resin (UT-61 (trade name) of Nippon A&L Inc., containing about 80 wt % of a free AS polymer component, about 20 wt % of an ABS polymer component (acetone insoluble gel matter) and about 14 wt % of a butadiene rubber component, having a weight average rubber particle diameter of 0.56 μm, and produced by bulk polymerization)

PET: polyethylene terephthalate having an IV of 0.52, produced by using a Ge-based catalyst (TR-MB of Teijin Limited)

PBT: polybutylene terephthalate having an IV of 0.875 (500 FP of Win Tech Polymer Ltd.)

MB: rubbery polymer-2 containing no styrene (Paraloid EXL-2602 of Rohm and Haas, consisting of a core containing about 80 wt % of polybutadiene and a shell made of a graft copolymer of methyl methacrylate and ethyl acrylate, and having a weight average particle diameter of 0.23 μm)

WRN1: wollastonite having an average particle diameter of 5 μm (SH-1250 of Kinseimatec Co., Ltd.)

WRN2: wollastonite having an average particle diameter of 4 μm (NYGLOS4 of NYCO Products Company)

TALC: compact fine powder talc (Upn HS-T0.8 of Hayashi-Kasei Co., Ltd.)

E: montanoic acid ester (Licowax E of Clariant Japan K.K.)

PEP: bis(2,4-di-t-butylphenyl)pentaerythritol diphosphite (ADK STAB PEP-24G of ADEKA Corporation)

M: trimethyl phosphate (TMP of Daihachi Chemical Industry Co., Ltd.)

DC: Diacarna 30 (mixture of 1-alkene-maleic anhydride copolymer and 1-alkene) of Mitsubishi Chemical Corporation UV701: (2-(2'-hydroxy-5-methylphenyl)benzotriazole (manufactured by Shipro Kasei Kaisha Ltd.)

CB: carbon black (RB961S of ECCA Co., Ltd.)

(IV) Production of Two-color Molded Product

Figure 5:
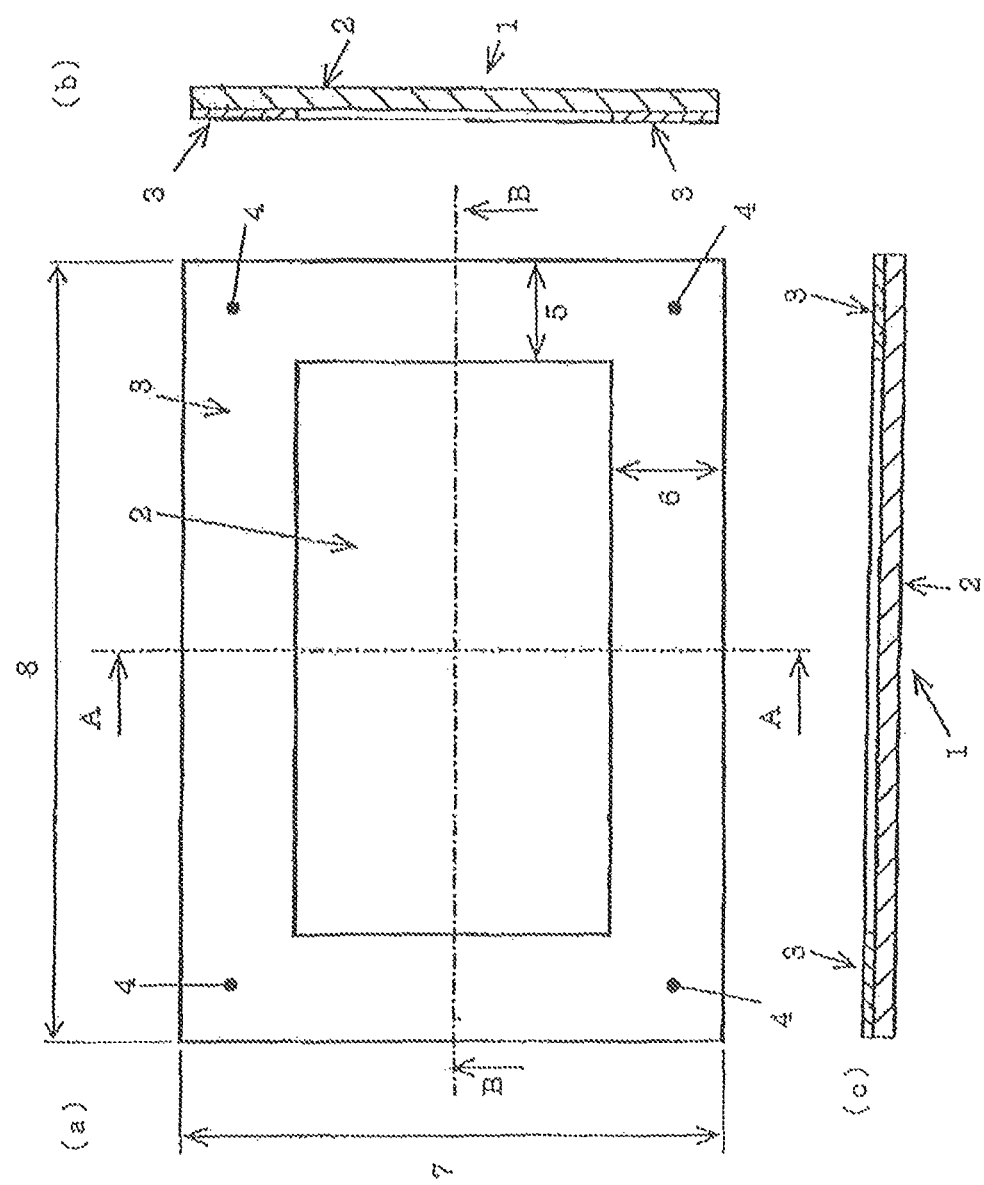
FIG. 5(*a*) is a top view of a laminate having a black-out layer.

The pellets obtained in (II) and (III) above were dried with a circulation hot air drier at 110° C. for 6 hours and molded by a molding machine capable of two-color molding (FN8000-36ATN of Nissei Plastic Industrial Co., Ltd.) to obtain a two-color molded product comprising a polycarbonate and a frame material as shown in FIG. 5 (56% of the area of a transparent member was bonded to the frame material). A laminated part consisting of the polycarbonate resin and the frame material of the obtained molded product was cut to prepare a 70 mm×50 mm test specimen.

(V) Preparation of Coating Composition for Primer Layer for Use in Hard Coat Layer (V-1) Preparation of Acrylic Copolymer Resin (Bp1)

85.6 parts by weight of ethyl methacrylate (to be abbreviated as "EMA" hereinafter), 16.8 parts by weight of cyclohexyl methacrylate (to be abbreviated as "CHMA" hereinafter), 13.0 parts by weight of 2-hydroxyethyl methacrylate (to be abbreviated as "HEMA" hereinafter), 12.0 parts by weight of the LA-82 hindered amine-based optical stabilizing group-containing methacrylate (1,2,2,6,6-pentamethyl-4-piperidyl methacrylate) (of ADEKA Corporation) and 191.1 parts by weight of 1-methoxy-2-propanol (to be abbreviated as "PGM" hereinafter) were added to a flask equipped with a reflux condenser and a stirrer, whose inside bad been substituted by nitrogen, to be mixed together. A nitrogen gas was let pass through the mixture for 15 minutes to remove oxygen, the temperature was raised to 70° C. in a nitrogen gas stream, and 0.33 part by weight of azobisisobutyronitrile (to be abbreviated as "AIBN" hereinafter) was added to carry out a reaction at 70° C. in a nitrogen gas stream under agitation for 5 hours. Further, 0.08 part by weight of AIBN was added, and the temperature was raised to 80° C. to carry out a reaction for 3 hours so as to obtain an acrylic copolymer solution having a nonvolatile content of 39.7 wt %.

(V-2) Preparation of Acrylic Copolymer Resin (Bp2)

An acrylic copolymer solution having a nonvolatile content of 39.6 wt % was obtained in the same manner as bp1 except that 74.2 parts by weight of EMA and 33.7 parts by weight of CHMA were used.

(V-3) Preparation of Acrylic Copolymer Resin (bp3)

443.4 parts by weight of methyl isobutyl ketone (to be abbreviated as "MIBK" hereinafter), 350.3 parts by weight of 2-[4-[(2-hydroxy-3-(2'-ethyl)hexyl)oxy]-2-hydroxyphenyl]-4,6-bis(2,4-dimethylphenyl)-1,3,5-triazine (Tinuvin 405 of Ciba Specialty Chemicals Corporation) and 93.1 parts by weight of 2-isocyanate ethyl methacrylate were added to a flask equipped with a reflux condenser and a stirrer to be mixed together and heated at 80° C. Then, 0.1 part by weight of dibutyltin dilaurate was added and stirred at the same temperature for 30 minutes to obtain 1-[3-hydroxy-4-{4,6-bis(2,4-dimethylphenyl)-1,3,5-triazin-2-yl}phenyloxy]-3-(2-ethylhexyloxy)-2-propyl of 2-methacryloxyethyl carbamide acid solution (to be abbreviated as "MOI-405" hereinafter) having a nonvolatile content of 49.5%.

Thereafter, 58.6 parts by weight of EMA, 33.7 parts by weight of CHMA, 13.0 parts by weight of HEMA, 53.9 parts by weight of the above MOI-T405, 35.9 parts by weight of LA-82 and 241.2 parts by weight of PGM were added to a flask equipped with a reflux condenser and a stirrer, whose inside had been substituted by nitrogen, to be mixed together. A nitrogen gas was let pass through the mixture for 15 minutes to remove oxygen, the temperature was raised to 70° C. in a nitrogen gas stream, and 0.33 part by weight of AIBN was added to carry out a reaction at 70° C. in a nitrogen gas stream under agitation for 5 hours. Further, 0.08 part by weight of AIBN was added, and the temperature was raised to 80° C. to carry out a reaction for 3 hours so as to obtain an acrylic copolymer solution having a nonvolatile content of 39.6 wt %.

(V-4) Preparation of Acrylic Resin-based Primer Coating Compositions (Bp1, Bp2)

66.4 parts by weight of MIBK, 33.2 parts by weight of 2-butanol (to be abbreviated as "2-BuOH" hereinafter) and 106.4 parts by weight of PGM were added to and mixed with 100 parts by weight of each of the above acrylic copolymer resin solutions bp1 and bp2, 9.8 parts by weight of VESTANAT B1358/100 (blocked polyisocyanate compound of Degussa Japan Co., Ltd.) was added to ensure that the amount of the isocyanate group became 1.0 equivalent based on 1 equivalent of the hydroxyl group of the acrylic copolymer contained in the acrylic resin solution, and further 4.2 parts by weight of Tinuvin 400 (triazine-based ultraviolet absorbent of Ciba Specialty Chemicals Corporation), 1.1 parts by weight of Tinuvin 479 (triazine-based ultraviolet absorbent of Ciba Specialty Chemicals Corporation), 9.5 parts by weight of APZ-6633 (ethanol solution of a silane coupling agent hydrolysis condensate of Dow Corning Toray Corporation; solid content of 5 wt %) and 0.015 part by weight of dimethyltin dineodecanoate were added and stirred at 25° C. for 1 hour to obtain acrylic resin-based primer coating compositions (Bp1 and Bp2).

(V-5) Preparation of Acrylic Resin-based Primer Coating Composition (Bp3)

65.4 parts by weight of MIBK, 32.7 parts by weight of 2-BuOH and 65.8 parts by weight of PGM were added to and mixed with 100 parts by weight of the above acrylic copolymer solution bp3, 7.6 parts by weight of VESTANAT B1358/100 was added to ensure that the amount of the isocyanate group became 1.0 equivalent based on 1 equivalent of the hydroxyl group of the acrylic copolymer contained in the acrylic copolymer solution, and further 13.7 parts by weight of APZ6633 and 0.07 part by weight of dimethyltin dineodecanoate was added and stirred at 25° C. for 1 hour to obtain an acrylic resin-based primer coating composition (Bp3).

(VI) Preparation of Coating Composition for Top Layer Used in Hard Coat Layer (VI-1) Preparation of Hard Coating Composition (Bt1)

0.1 part by weight of concentrated hydrochloric acid (12 M) was added to 100 parts by weight of a water-dispersible colloidal silica dispersion liquid (Cataloid SN-30 of Catalysts & Chemicals Industries Co., Ltd., solids content of 30 wt %) and stirred well. This dispersion liquid was cooled to 10° C., and 161 parts by weight of methyltrimethoxysilane was added dropwise to this dispersion liquid. Right after the addition of methyltrimethoxysilane, the temperature of the mixed solution began to rise by reaction heat and reached 60° C. in a few minutes after the start of addition. After 60° C. was reached, the temperature of the reaction solution was gradually reduced by cooling with an iced water bath. When the temperature of the reaction solution became 35° C., the reaction solution was stirred for 5 hours to keep this temperature, and 0.8 part by weight of a 45% choline methanol solution as a curing catalyst and 4.9 parts by weight, of acetic acid as a pH control agent were mixed with this reaction solution to obtain a coating composition undiluted solution (α).

138 parts by weight of isopropyl alcohol (to be abbreviated as "IPA" hereinafter) was added to 209 parts by weight of the above coating composition undiluted solution (α) and stirred to obtain a coating composition (Bt1).

The total content of colloidal silica and the alkoxysilane hydrolysis condensate was 9.9 wt %.

(VI-2) Preparation of Hard Coating Composition (Bt2)

112.1 parts by weight of IPA was added dropwise to 5.5 parts by weight of cerium oxide slurry (NanoTek Slurry CEANB of C.I. Kasei Co., Ltd., solids content of 15 wt %) under agitation to dilute it. While the diluted slurry was further stirred, 209 parts by weight of the above coating composition undiluted solution (α) was added dropwise to the slurry to obtain a coating composition (Bt2).

The total content, of colloidal silica and the alkoxysilane hydrolysis condensate was 97 wt %.

Examples 9 to 17, Comparative Examples 6 to 9

The acrylic resin-based primer coating compositions (Bp1 to Bp3) prepared in (V) were each applied to the substrate formed by two-color molding in (II) to (IV) above by a flow coating technique to ensure that the film thickness became 4 to 10 μm after thermal curing, left to stand at 25° C. for 20 minutes, thermally cured at 130° C. for 60 minutes and left to be cooled for 40 minutes, and the hard coating compositions (Bt1, Bt2) prepared in (VI) were each applied to the coating film by the flow coating technique to ensure that the film thickness became 2 to 5 μm after thermal curing, left to stand at 25° C. for 20 minutes and thermally cured at 130° C. for 60 minutes. C1 (glass primer (GP-402 of Sunstar Engineering Inc.)), C2 (HAMAMATITE Glass Primer G (MS-90 of Yokohama Rubber Co., Ltd.)), C3 (HAMAMATITE Glass Primer G (PC-3) (of Yokohama Rubber Co., Ltd.)), C4 (Primer 35 (of Sunrise MSI Corporation)) and C5 (HAMATITE Body Primer G containing no silane coupling agent (RC-50E of Yokohama Rubber Co., Ltd.)) were each applied as a adhesive primer in combination as shown in Table 6 to the obtained hard coated substrate, and D1 which is the Penguin Seal #560 moisture-curable one-pack type urethane adhesive (of Sunstar Engineering Inc.) as an elastic adhesive and E2 (WS-222 (of Yokohama Rubber Co., Ltd.)) were used in combination as shown In Table 6 to prepare test specimens shown in FIG. 4 which were then cured for 1 week and heated at 70° C. for 500 hours while a displacement of 1 to 6 mm was applied to the test specimens so as to evaluate the hand peel adhesion described in (I-B-iii) above. The results are shown in Table 6.

TABLE 6

|  | Amount of displacement (mm) | Long side length seen from the amount of displacement (mm) | Ex 9 | Ex. 10 | Ex. 11 | Ex. 12 | Ex. 13 | Ex. 14 | Ex. 15 | Ex. 16 | Ex. 17 |
| --- | --- | --- | --- | --- | --- | --- | --- | --- | --- | --- | --- |
| Polycarbonate resin layer (layer A) |  |  | A1 | A1 | A1 | A2 | A1 | A1 | A1 | A1 | A1 |
| Black-out layer (layer E) |  |  | E1 | E1 | E1 | E1 | E2 | E1 | E1 | E3 | E4 |
| Hard coat (primer) layer (layer Bp) |  |  | Bp1 | Bp2 | Bp3 | Bp2 | Bp2 | Bp2 | Bp2 | Bp2 | Bp1 |
| Hard coat (top) layer (layer Bt) |  |  | Bt1 | Bt1 | Bt1 | Bt1 | Bt1 | Bt2 | Bt1 | Bt1 | Bt1 |
| Adhesive primer layer (layer C) |  |  | C1 | C1 | C1 | C1 | C1 | C1 | C2 | C1 | C1 |
| Adhesive layer (layer D) |  |  | D1 | D1 | D1 | D1 | D1 | D1 | D2 | D1 | D1 |
| Thickness of adhesive primer layer (layer C) (μm) |  |  | 8 | 8 | 8 | 8 | 8 | 8 | 8 | 8 | 8 |
| Thickness of adhesive layer (layer D): 8 mm | 1 | 500 | 100 | 100 | 100 | 100 | 98 | 100 | 100 | 100 | 100 |
|  | 2 | 1000 | 100 | 100 | 90 | 100 | 95 | 100 | 80 | 100 | 100 |
|  | 3 | 1500 | 100 | 100 | 80 | 100 | 95 | 100 | 80 | 100 | 100 |
|  | 4 | 2000 | 100 | 90 | 60 | 90 | 90 | 100 | 60 | 100 | 90 |
|  | 5 | 2500 | 100 | 85 | 55 | 85 | 65 | 90 | 55 | 90 | 85 |
|  | 6 | 3000 | 80 | 60 | 5 | 60 | 50 | 60 | 5 | 60 | 70 |

TABLE 6-continued

| Thickness of adhesive layer (layer D): 6 mm | | | | | | | | | | | |
|---|---|---|---|---|---|---|---|---|---|---|---|
| | 1 | 500 | 100 | 100 | 95 | 100 | 95 | 100 | 90 | 100 | 100 |
| | 2 | 1000 | 100 | 100 | 90 | 100 | 95 | 100 | 80 | 100 | 100 |
| | 3 | 1500 | 100 | 90 | 60 | 90 | 90 | 100 | 60 | 100 | 100 |
| | 4 | 2000 | 100 | 85 | 5 | 85 | 50 | 90 | 5 | 90 | 80 |
| | 5 | 2500 | 90 | 50 | 0 | 50 | 5 | 60 | 0 | 80 | 60 |
| | 6 | 3000 | 60 | 5 | | 5 | 0 | 20 | | 50 | 50 |

| | Amount of displacement (mm) | Long side length seen from the amount of displacement (mm) | C. Ex. 1 | C. Ex. 2 | C. Ex. 3 | C. Ex. 4 |
|---|---|---|---|---|---|---|
| Polycarbonate resin layer (layer A) | | | A1 | A1 | A1 | A1 |
| Black-out layer (layer E) | | | E1 | E1 | E1 | E1 |
| Hard coat (primer) layer (layer Bp) | | | Bp1 | Bp1 | Bp1 | Bp1 |
| Hard coat (top) layer (layer Bt) | | | Bt1 | Bt1 | Bt1 | Bt1 |
| Adhesive primer layer (layer C) | | | C1 | C3 | C4 | C5 |
| Adhesive layer (layer D) | | | D1 | D1 | D1 | D1 |
| Thickness of adhesive primer layer (layer C) (μm) | | | 0.5 | 8 | 8 | 8 |
| Thickness of adhesive layer (layer D): 8 mm | 1 | 500 | | 0 | 100 | 30 |
| | 2 | 1000 | | | 100 | 0 |
| | 3 | 1500 | | | 98 | |
| | 4 | 2000 | | | 0 | |
| | 5 | 2500 | | | | |
| | 6 | 3000 | | | | |
| Thickness of adhesive layer (layer D): 6 mm | 1 | 500 | | | 100 | 0 |
| | 2 | 1000 | | | 50 | |
| | 3 | 1500 | | | 0 | |
| | 4 | 2000 | | | | |
| | 5 | 2500 | | | | |
| | 6 | 3000 | | | | |

Ex.: Example
C. Ex.: Comparative Example

Example 18

The pellets A1 and B1 prepared in (II) and (III) above were dried with a circulation hot air drier at 20° C. for 6 hours and molded by a molding machine capable of two-color molding (FN8000-36ATN of Nissei Plastic Industrial Co., Ltd.) to obtain a two-color molded product comprising a polycarbonate resin layer and a frame material (black-out layer) as shown in FIG. 5 (56% of the area of a transparent member was bonded to the frame material). The acrylic resin-based primer coating composition Bp2 prepared in (V) above was applied to the polycarbonate resin layer and the frame member layer of the obtained two-color molded product by the flow coating technique to ensure that the film thickness became about 5 μm after thermal curing, left to stand, at 25° C. for 20 minutes, thermally cured at 130° C. for 60 minutes and left to be cooled for 40 minutes, and the hard coating composition Bt1 prepared in (VI) above was applied to the coating film by the flow coating technique to ensure that the film thickness became about 4 μm after thermal curing, left to stand at 25° C. for 20 minutes and thermally cured at 130° C. for 60 minutes.

The GP-402 glass primer (of Sunstar Engineering Inc.) was applied to the peripheral part of the obtained molded product to a thickness of 8 μm, and the Penguin Seal #560 elastic adhesive (of Sunstar Engineering Inc.) was applied in a triangle having a width of 12 mm and a height of 15 mm. The molded sheet coated with the urethane adhesive was attached to a stainless steel frame coated with the HAMA-TITE Body Primer M (RC-50E) (of Yokohama Rubber Co., Ltd.) to a thickness of 8 μm to ensure that the thickness of the urethane adhesive became 6 mm. This thickness was adjusted by installing a spacer of the same thickness on the stainless steel frame. After the obtained adhesive structure was cured in a 23° C. 50% RH atmosphere for 1 week, it was placed in a 70° C. hot air drying furnace together with the frame to be treated for 1,000 hours. The adhesive structure was fixed without the separation of the adhesive.

Examples 19 to 23, Comparative Examples 10 to 12

(I) Evaluation Items
(I-A) Measurement of Indentation Elasticity Modulus of Adhesive Primer by Nano-indentation Method After an adhesive primer was applied to a hard coat layer on a polycarbonate substrate by using a BEMCOT wiper which was fully impregnated with a primer solution and cured for 1 week, the obtained primer layer was cut cross-sectionally with a microtome to measure the indentation elasticity modulus of the obtained smooth cross-section. The thickness of the adhesive primer layer was about 50 μm. The above measurement was made at the center part of the thickness of the primer layer. The indentation elasticity modulus measured by the nano-indentation method means a value when the thickness of the adhesive primer layer is 50 μm.

As for the measurement of the indentation elasticity modulus, an indentation test was made on the surface part of the obtained primer layer with an ultrafine indentation hardness tester (the ENT-2100 of ELIONIX INC.). At the time of indentation, the sample was placed under load at a loading speed of 20.4 mgf/sec, held under a maximum load of 800 μN for 1 second and unloaded at the same loading speed by using a Berkovich indenter (α:65.03°). The results are shown in Table 7.

TABLE 7

|  | Adhesive primer | |
| --- | --- | --- |
|  | GP-402 | Primer 35 (for comparison) |
| Indentation elasticity modulus (MPa) | 1199 | 5846 |

(I-B) Evaluation of Hand Peel Adhesion
(I-B-i) Preparation of Specimen

An adhesive primer was applied to a 70 mm×50 mm laminate having a hard coat layer on a substrate layer with a BEMCOT wiper, and a moisture-curable polyurethane-based adhesive was applied to the primer layer with a triangle bead wire having a bottom side length of 8 mm and a height of 12 mm. Similarly, the thickness of the adhesive was reduced to an evaluation height by the laminate coated with the adhesive primer and then, the laminate was cured in a 23° C. 50% RH atmosphere for 1 week.

(I-B-ii) Stress Test

Figure 6:
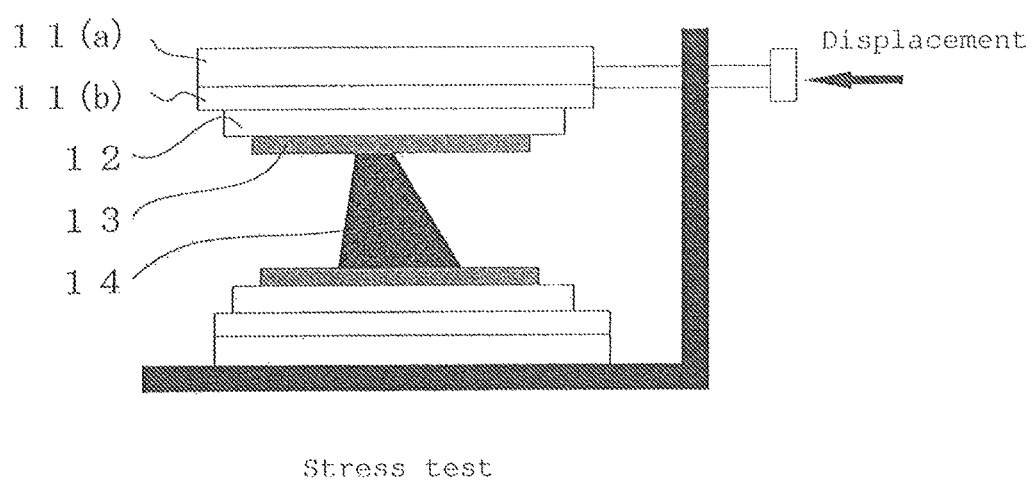
FIG. 6 illustrates a laminate manufactured in Examples 19 to 23 and Comparative Examples 10 to 12 and a stress test.

As shown in FIG. 6, the test specimen prepared in (I-B-i) was fixed to a stress testing jig, a displacement of 1 to 6 mm was applied to the laminate side, and the test specimen was kept in a 40° C. 100% RH thermohygrostat bath for 500 hours. After storage, the test specimen was removed from the jig, and the adhesive was cut away at a position where the thickness was 8 mm from an upper plate to be used for a hand peel adhesion test.

The displacement applied in the stress test was calculated by applying the equation (9) at page 392 of the above Non-patent Document 1 to a polycarbonate resin. That is, the following equation was applied.

$$\Delta l = l_0 \times \Delta\alpha \times \Delta T = l_0 \times 58 \times 10^{-6} \times 70 \approx 4 \times l_0 \text{ (mm)}$$

In the above equation, $l_0$ is the long side length (m) of a substrate, $\Delta\alpha$ is a difference between the linear expansion coefficient ($12 \times 10^{-6} \times K^{-1}$) of steel and the linear expansion coefficient ($70 \times 10^{-6} \times K^{-1}$) of a polycarbonate resin, and $\Delta T$ is a temperature difference of 70° C. based on the assumption that the specimen is used at 20 to 90° C. according to the Non-Patent Document 1. Further, as described in the Non-patent Document 1, since the both ends of the bonded glazing move freely, the displacement applied to the adhesive is ½. Therefore, the assumed amount of displacement of the adhesive can be calculated as "$2 \times l_0$ (mm)". The relationship between the long side length of the substrate layer and the assumed amount of displacement calculated by this computation is shown in Table 8 (rounded to integers).

TABLE 8

| | Long side length of substrate layer (mm) | | | | | |
| --- | --- | --- | --- | --- | --- | --- |
| | 500 | 1000 | 1500 | 2000 | 2500 | 3000 |
| Amount of displacement (mm) | 1 | 2 | 3 | 4 | 5 | 6 |

(I-B-iii) Hand Peel Adhesion Test

In the hand peel adhesion test, a cut was made in the adhesion interface with a cutter knife while an adhesive bead was pulled. "100" means that the area of cohesive failure of the adhesive is 100%. "80" means that the area of the cohesive failure of the adhesive is 80% and the area of interface destruction is 20%. The area of cohesive failure is preferably not less than 75%, more preferably 100%.

(II) Production of Substrate Layer
(II-1-i) Polycarbonate Resin (Aa1)

The Panlite L-1250WP of Teijin Chemicals Ltd. which is a polycarbonate resin powder having a viscosity average molecular weight of 23,900 obtained by polymerizing bisphenol A and phosgene by interfacial polymerization in accordance with a commonly used method was used.

(II-1-ii) Heat-ray Absorbing Polycarbonate Resin (Aa2)

The Panlite AM-1125ZV of Teijin Chemicals Ltd. which is prepared by blending a heat-ray absorbent with a polycarbonate resin powder having a viscosity average molecular weight of 23,900 obtained by polymerizing bisphenol A and phosgene by interfacial polymerization in accordance with a commonly used method was used.

(11-2) Thermoplastic Resin (Ab)

The thermoplastic resins used in Examples and Comparative Examples are shown below and the abbreviations of the resins are given below. The Vicat softening temperatures of these resins measured under a test load of 50 N at a temperature elevation rate of 50° C./h in accordance with ISO 306 B-50 are shown in Table 9. The amount of the ultraviolet absorbent is 2 parts by weight based on 100 parts by weight of the thermoplastic resin. ADR STAB LA-31 (of ADEKA Corporation) was used as the ultraviolet absorbent.
HT121: ALTOGLAS HT121 of ARKEMA Co., Ltd.
980N: 980N of Asahi Kasei Chemicals Corporation
PM120B: PM120N of Asahi Kasei Chemicals Corporation (III) Production of Coextrusion Sheet The polycarbonate resin described in (II-1) and (II-2) forming the above polycarbonate resin layer (layer Aa) was molten by means of a single-screw extruder having a screw diameter of 40 mm, the thermoplastic resin forming the above thermoplastic resin layer (layer Ab) was molten by means of a single-screw extruder having a screw diameter of 30 mm, the both resins were formed into a double-layer laminate by a feed block method, the resulting laminate was extruded from a T die having a set temperature of 280° C., and the obtained sheet was cooled with a mirror-finished roll to obtain a resin laminate having the thermoplastic resin layer shown in Table 1 on one side of the polycarbonate resin, sheet. The thicknesses of the layer Aa and the layer Ab and the thickness ratio of the layer Aa and the layer Ab are shown in Table 9.

(IV) Preparation of Coating Composition for Use in Thermosetting Thin Film Layer
(IV-1) Preparation of Silicone-based Resin Coating Composition (B-1)

0.1 part by weight of concentrated, hydrochloric acid (12 M) was added to 100 parts by weight of a water-dispersible colloidal silica dispersion liquid (Cataloid SN-30 of Catalysts & Chemicals Industries Co., Ltd., solids content of 30 wt %) and stirred well. This dispersion liquid was cooled to 10° C., and 161 parts by weight of methyltrimethoxysilane was added dropwise to this dispersion liquid. Right after the addition of methyltrimethoxysilane, the temperature of the mixed solution, began to rise by reaction heat and reached 60° C. in a few minutes after the start of addition. After 60° C. was reached, the temperature of the reaction solution was gradually reduced by cooling with an iced water bath. When the temperature of the reaction solution became 35° C., the reaction solution was stirred for 5 hours to keep this temperature, and 0.7 part by weight of a 45% choline methanol solution as a curing catalyst and 4.9 parts by weight of acetic acid as a pH control agent were mixed with this reaction solution to obtain a coating composition undiluted solution (α).

100 parts by weight of 2-propanol was added dropwise to 7.2 parts by weight of cerium oxide slurry (NanoTek Slurry CEANB of C.I. Kasei Co., Ltd.) under agitation to dilute it. While the diluted slurry was further stirred, 264 parts by weight of the above coating composition undiluted solution (α) was added dropwise to the slurry, and 311 parts of ethyl acetate was further added dropwise after the end of addition. Finally, 0.55 part by weight of SH28PA (of Dow Corning Toray Corporation) was added to provide leveling properties so as to obtain a coating composition containing an organosiloxane resin (B-1). The average particle diameter of cerium oxide fine particles contained in the coating composition (B-1) measured by a dynamic light scattering method (FPAR-1000 of Otsuka Electronics Co., Ltd.) was 45 nm. In an organosiloxane composition obtained by curing (B-1), the amount of cerium oxide fine particles was 1 part by weight based on 100 parts by weight of an organosiloxane resin component derived from colloidal silica and methyltrimethoxysilane.

(IV-2) Preparation of Silicone-based Resin Coating Composition (B-2)

A coating composition (B-2) comprising an organosiloxane resin was obtained in the same manner as (IV-1) the preparation of silicone-resin coating composition (B-2) except that 391 parts by weight of isopropyl alcohol was used in place of ethyl acetate as a dilution solvent.

(IV-3) Preparation of Acrylic Resin Coating Composition (B-3)

The Superlac Neo LT of Nippon Paint Co., Ltd. was used as the acrylic resin coating composition (B-3) directly.

(IV-4) Preparation of Melamine-Based Resin Coating Composition (B-4)

62.8 parts by weight of ethyl methacrylate, 50.5 parts by weight of cyclohexyl methacrylate, 13.0 parts by weight of hydroxyethyl methacrylate and 192.6 parts by weight of 1-methoxy-2-propanol were added to a flask equipped with a reflux condenser and a stirrer, whose inside had been substituted by nitrogen, to be mixed together. A nitrogen gas was let pass through the mixture for 15 minutes to remove oxygen, the temperature was raised to 70° C. in a nitrogen gas stream, and 1.3 parts by weight of AIBN was added to carry out a reaction at 70° C. in a nitrogen gas stream under agitation for 5 hours. Further, 0.7 part by weight of AIBN2 was added, and the temperature was raised to 80° C. to carry out a reaction for 3 hours so as to obtain an acrylic copolymer solution having a nonvolatile content of 40.0 wt % (β).

20 parts by weight of the acrylic copolymer solution (β), 70 parts by weight of 1,6-hexanediol as a crosslinking agent, 5 parts by weight of maleic acid as a curing agent, and 150 parts of isopropyl alcohol, 320 parts of isobutyl alcohol and 25 parts of ethylene glycol monobutyl ether as solvents were added to and mixed with 100 parts by weight of methylated methylol melamine (Cymel 301 of Japan Cytec Industries, Inc.) to obtain a melamine-based resin coating composition (B-4).

A coextrusion sheet was manufactured by using the polycarbonate resin and the thermoplastic resin described in (II) and (III) above in accordance with the method described in (IV) above. The amount of the ultraviolet absorbent contained in the thermoplastic resin layer (layer Ab) of the coextrusion sheet and the thicknesses of the polycarbonate resin layer (layer Aa) and the thermoplastic resin layer (layer Ab) are shown in Table 9.

The thermosetting coating composition prepared in (IV) was applied to the obtained coextrusion sheet by the flow coating technique, left, to stand at 25° C. for 15 minutes and thermally cured for 1 hour to form a thermosetting thin film layer (layer B) so as to manufacture a polycarbonate resin laminate. The type and thermal curing temperature of the thermosetting coating composition in use and the thickness of the layer B are shown in Table 9. C1 (glass primer (GP-402 of Sunstar Engineering Inc.)), C2 (HAMATITE glass primer (MS-90 of Yokohama Rubber Co., Ltd.)) and C3 (Primer 35 (of Sunrise MSI Corporation)) were each applied as an adhesive primer as shown in Table 9 to the obtained hard coated substrate, and DI (Penguin Seal #560 which is a moisture-curable one-pack type urethane adhesive (manufactured by Sunstar Engineering Inc.)) and D2 (WS-222 (of Yokohama Rubber Co., Ltd.)) were each used as an elastic adhesive to prepare test specimens shown in FIG. 6 which were then cured for 1 week and heated at 70° C. for 500 hours while a displacement of 1 to 6 mm was applied so as to evaluate the hand peel adhesion described in (I-B-iii) above. The results are shown in Table 9.

TABLE 9

| | | | Treating conditions | Amount of displacement (mm) | Long side length seen from amount of displacement (mm) | Ex. 19 | Ex. 20 | Ex. 21 | Ex. 22 |
|---|---|---|---|---|---|---|---|---|---|
| Substrate layer (layer A) | Layer Aa | used resin | | | | L-1250WP | AM-1125ZV | L-1250WP | L-1250WP |
| | | Vicat softening temperature/° C. | | | | 149 | 149 | 149 | 149 |
| | Layer Ab | used resin | | | | HT121 | PM120N | HT121 | HT121 |
| | | Vicat softening temperature/° C. | | | | 119 | 123 | 119 | 119 |
| | | Linear expansion coefficient of layer Ab($10^{-5}$/K) (average at 100 to 130° C.) | | | | 60 | 40 | 60 | 60 |
| Hard coat layer (layer B) | layer B | | | | | B-1 | B-1 | B-1 | B-2 |
| | Wt % of colloidal silica and/or alkoxysilane hydrolysis condensate | | | | | 97 | 97 | 97 | 97 |

TABLE 9-continued

| | | | | | | | | | |
|---|---|---|---|---|---|---|---|---|---|
| Adhesive primer Layer (layer C) | layer C | | | | | C1 | C1 | C2 | C1 |
| Adhesive (D) | layer D | | | | | D1 | D1 | D2 | D1 |
| Thickness of layer Aa/mm | | | | | | 3.85 | 19.90 | 3.85 | 3.85 |
| Thickness of layer Ab/mm | | | | | | 0.15 | 0.10 | 0.15 | 0.15 |
| Thickness of layer B/mm | | | | | | 4 | 4 | 4 | 4 |
| Thickness of layer C/μm | | | | | | 8 | 8 | 8 | 8 |
| Thickness of adhesive layer (layer D) 8 mm | | 70° C. 500 h | 1 | 500 | | 100 | 100 | 100 | 100 |
| | | | 2 | 1000 | | 100 | 100 | 100 | 100 |
| | | | 3 | 1500 | | 100 | 100 | 100 | 100 |
| | | | 4 | 2000 | | 100 | 100 | 100 | 100 |
| | | | 5 | 2500 | | 100 | 100 | 90 | 100 |
| | | | 6 | 3000 | | 65 | 65 | 60 | 60 |
| Thickness of adhesive layer (layer D) 6 mm | | 70° C. 500 h | 1 | 500 | | 100 | 100 | 100 | 100 |
| | | | 2 | 1000 | | 100 | 100 | 100 | 100 |
| | | | 3 | 1500 | | 100 | 100 | 100 | 100 |
| | | | 4 | 2000 | | 100 | 100 | 90 | 100 |
| | | | 5 | 2500 | | 50 | 50 | 50 | 45 |
| | | | 6 | 3000 | | 5 | 5 | 5 | 5 |

| | | | Treating conditions | Amount of displacement (mm) | Long side length seen from amount of displacement (mm) | Ex. 23 | C. Ex. 10 | C. Ex. 11 | C. Ex. 12 |
|---|---|---|---|---|---|---|---|---|---|
| Substrate layer (layer A) | Layer Aa | used resin | | | | L-1250WP | L-1250WP | L-1250WP | AM-1125ZV |
| | | Vicat softening temperature/° C. | | | | 149 | 149 | 149 | 149 |
| | Layer Ab | used resin | | | | HT121 | PM120N | 980N | HT121 |
| | | Vicat softening temperature/° C. | | | | 119 | 123 | 123 | 119 |
| | | Linear expansion coefficient of layer Ab($10^{-5}$/K) (average at 100 to 130° C.) | | | | 60 | 40 | 50 | 60 |
| Hard coat layer (layer B) | layer B | | | | | B-1 | B-1 | B-3 | B-4 |
| | Wt % of colloidal silica and/or alkoxysilane hydrolysis condensate | | | | | 97 | 97 | 0 | 0 |
| Adhesive primer Layer (layer C) | layer C | | | | | C1 | C3 | C1 | C1 |
| Adhesive (D) | layer D | | | | | D1 | D1 | D1 | D1 |
| Thickness of layer Aa/mm | | | | | | 3.85 | 3.85 | 4.85 | 0.90 |
| Thickness of layer Ab/mm | | | | | | 0.15 | 0.15 | 0.15 | 0.10 |
| Thickness of layer B/mm | | | | | | 4 | 4 | 14 | 10 |
| Thickness of layer C/μm | | | | | | 8 | 8 | 8 | 8 |
| Thickness of adhesive layer (layer D) 8 mm | | 70° C. 500 h | 1 | 500 | | 100 | 100 | 0 | 0 |
| | | | 2 | 1000 | | 100 | 100 | | |
| | | | 3 | 1500 | | 100 | 95 | | |
| | | | 4 | 2000 | | 100 | 0 | | |
| | | | 5 | 2500 | | 100 | | | |
| | | | 6 | 3000 | | 65 | | | |
| Thickness of adhesive layer (layer D) 6 mm | | 70° C. 500 h | 1 | 500 | | 100 | 100 | | |
| | | | 2 | 1000 | | 100 | 100 | | |
| | | | 3 | 1500 | | 100 | 90 | | |
| | | | 4 | 2000 | | 100 | 0 | | |
| | | | 5 | 2500 | | 50 | | | |
| | | | 6 | 3000 | | 5 | | | |

Ex.: Example
C. Ex.: Comparative Example

Effect of the Invention

The adhesive laminate of the present invention can achieve excellent adhesiveness with the same thickness of an elastic adhesive layer (layer D) as that when a glass window having small linear expansion is attached at the time of bonding to a structural member. If the adhesive laminate of the present invention becomes large in size, it can be attached to a structural member without increasing the thickness of the adhesive layer.

INDUSTRIAL APPLICABILITY

The adhesive laminate of the present invention can be advantageously used in glazing materials for vehicles such as backdoor windows, sunroofs, roof panels, detachable tops, window reflectors, winker lamp lenses (including covers), room lamp lenses (including covers) and display front panels.

Further, the adhesive laminate of the present invention can be used in a wide variety of fields such as windowpanes for construction machinery, windowpanes for buildings, houses and greenhouses, and roofs for garages and arcades.

The invention claimed is:

1. An adhesive laminate comprising:
   (A) a light-transmitting substrate layer (layer A) formed from a melt extruded thermoplastic resin, wherein the thermoplastic resin is a polycarbonate resin or an acrylic resin,
   (B) a hard coat layer (layer B) formed by using a hard coating agent comprising 13 to 99 wt % of colloidal silica and/or an alkoxysilane hydrolysis condensate based on the total weight of the layer B excluding a solvent,
   (C) an adhesive primer layer (layer C), and
   (D) a urethane elastic adhesive layer (layer D), wherein
   (i) the layers A to D are formed in this order;
   (ii) the layer C is formed from a primer composition comprising 10 to 45 wt % of a silane modified polyisocyanate which is a reaction product of γ-mercaptopropyltrimethoxysilane and polyisocyanate based on 100 wt % of a solids content of the primer composition excluding the solvent, and has a thickness of 1.5 to 8 μm and an indentation elasticity modulus measured by a nano-indentation method under a load of 800 μN of 1,000 to 3,500 MPa;
   (iii) the layer D has a thickness (Y) of 2 to 8 mm; and
   (iv) when a long side length of the substrate layer A is represented by X (mm) and the thickness of the layer D is represented by Y (mm), X and Y satisfy the following expressions (2) and (3):

$$3\times10^{-3}X \leq Y < 6 \text{ (when } 300 \leq X \leq 1500\text{)} \quad (2)$$

$$3\times10^{-3}X \leq Y < (16/3)\times10^{-3}X - 2 \text{ (when } 1500 < X \leq 3000\text{)} \quad (3).$$

2. The laminate according to claim 1, further comprising a black-out layer (layer E) between the layer A and the layer B.

3. The laminate according to claim 2, wherein the layer A and the black-out layer (layer E) are formed by two-color molding.

4. The laminate according to claim 1, wherein the long side length (X) of the substrate layer A is 300 to 2,500 mm.

5. The laminate according to claim 1, wherein the layer B is formed by curing by at least one method selected from the group consisting of ionizing radiation irradiation, infrared irradiation, microwave irradiation, and hot water vapor exposure.

6. The laminate according to claim 1, wherein the layer A comprises two layers formed by coextrusion having equal long side lengths.

7. The laminate according to claim 6, wherein one of the two layers is an acrylic resin layer (layer A2), and wherein a linear expansion coefficient of the layer A2 is $3\times10^{-5}$ to $80\times10^{-5}$/K on average at 100 to 130° C.

8. The laminate according to claim 1, which is attached to a structural member.

9. A method of glazing, comprising applying the laminate according to claim 1 on a structural member.

10. A method of applying the laminate according to claim 1 on a structural member, comprising glazing the laminate onto the structural member.

* * * * *